United States Patent
Crothers et al.

(10) Patent No.: US 11,345,082 B2
(45) Date of Patent: May 31, 2022

(54) METHODS FOR ADDITIVELY MANUFACTURING AN OBJECT FROM A POWDER MATERIAL

(71) Applicant: The Boeing Company, Chicago, IL (US)

(72) Inventors: Phillip J. Crothers, Hampton East (AU); Philip L. Freeman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 16/578,853

(22) Filed: Sep. 23, 2019

(65) Prior Publication Data

US 2021/0086439 A1    Mar. 25, 2021

(51) Int. Cl.
*B29C 64/153*    (2017.01)
*B29C 64/214*    (2017.01)
(Continued)

(52) U.S. Cl.
CPC .......... *B29C 64/153* (2017.08); *B29C 64/214* (2017.08); *B29C 64/232* (2017.08);
(Continued)

(58) Field of Classification Search
CPC .......... B22F 12/50; B22F 12/52; B22F 12/53; B22F 3/1055; B22F 2003/1056;
(Continued)

(56) References Cited

U.S. PATENT DOCUMENTS 6,858,059 B2    2/2005    Yamamoto et al.
8,647,548 B1    2/2014    Humfeld
(Continued)

FOREIGN PATENT DOCUMENTS

CN    203186886    9/2013
CN    103990198    8/2014
(Continued)

OTHER PUBLICATIONS

European Patent Office, Extended European Search Report, App. No. 20190729.2 (dated Jan. 14, 2021).

*Primary Examiner* — Philip C Tucker
*Assistant Examiner* — Jimmy R Smith, Jr.
(74) *Attorney, Agent, or Firm* — Walters & Wasylyna LLC

(57) ABSTRACT

A method (1000) of additively manufacturing an object (200) from a powder material (202) comprises discharging the powder material (202) from a powder-deposition opening (126) in a hollow body (122) of a powder-supply arm (108) while rotating the powder-supply arm (108) and an energy-supply arm (112) about a vertical axis A1. Method (1000) also comprises, while rotating the powder-supply arm (108) and the energy-supply arm (112) about the vertical axis A1, distributing the powder material (202) within a powder-bed volume (204) using a powder-distribution blade (128) that is coupled to the hollow body (122) and extends along the powder-deposition opening (126). The method (1000) further comprises, while rotating the powder-supply arm (108) and the energy-supply arm (112) about vertical axis A1, consolidating at least a portion of the powder material (202) in the powder-bed volume (204) using the energy emitters (114), coupled to the energy-supply arm (112).

16 Claims, 24 Drawing Sheets

(51) Int. Cl.
*B29C 64/241* (2017.01)
*B29C 64/245* (2017.01)
*B29C 64/232* (2017.01)
*B29C 64/295* (2017.01)
*B33Y 30/00* (2015.01)
*B33Y 10/00* (2015.01)

(52) U.S. Cl.
CPC .......... *B29C 64/241* (2017.08); *B29C 64/245* (2017.08); *B29C 64/295* (2017.08); *B33Y 10/00* (2014.12); *B33Y 30/00* (2014.12)

(58) Field of Classification Search
CPC ...... B22F 2003/1057; B22F 2003/1058; B22F 2003/1059; B22F 10/20; B29C 64/321; B29C 64/264; B29C 64/268; B29C 64/277; B29C 71/04; B29C 64/153
USPC ................................................ 425/174, 174.4
See application file for complete search history.

(56) References Cited

U.S. PATENT DOCUMENTS

| | | | |
|---|---|---|---|
| 10,016,852 B2 | 7/2018 | Broda | |
| 2008/0006334 A1* | 1/2008 | Davidson | B33Y 30/00 |
| | | | 137/571 |
| 2008/0042321 A1* | 2/2008 | Russell | B41J 2/16535 |
| | | | 264/308 |
| 2009/0033003 A1 | 2/2009 | Sievers et al. | |
| 2009/0312454 A1* | 12/2009 | Leuterer | B29C 64/153 |
| | | | 522/164 |
| 2015/0290741 A1 | 10/2015 | Abe et al. | |
| 2017/0314402 A1* | 11/2017 | Schloffer | B28B 1/008 |
| 2018/0326655 A1* | 11/2018 | Herzog | B22F 12/00 |
| 2018/0345369 A1* | 12/2018 | Corsmeier | B22F 12/00 |
| 2020/0223139 A1* | 7/2020 | Hunze | B22F 10/30 |
| 2021/0053286 A1* | 2/2021 | Yudovsky | B22F 10/00 |
| 2021/0260666 A1* | 8/2021 | Edinger | B29C 64/329 |

FOREIGN PATENT DOCUMENTS

| | | |
|---|---|---|
| EP | 2 910 323 | 8/2015 |
| JP | H01 237123 | 9/1989 |
| JP | 2005-059477 | 3/2005 |
| JP | 2009-108348 | 5/2009 |
| JP | 5 612735 | 10/2014 |
| RU | 2487779 | 7/2013 |
| WO | WO 2014/137890 | 9/2014 |

* cited by examiner

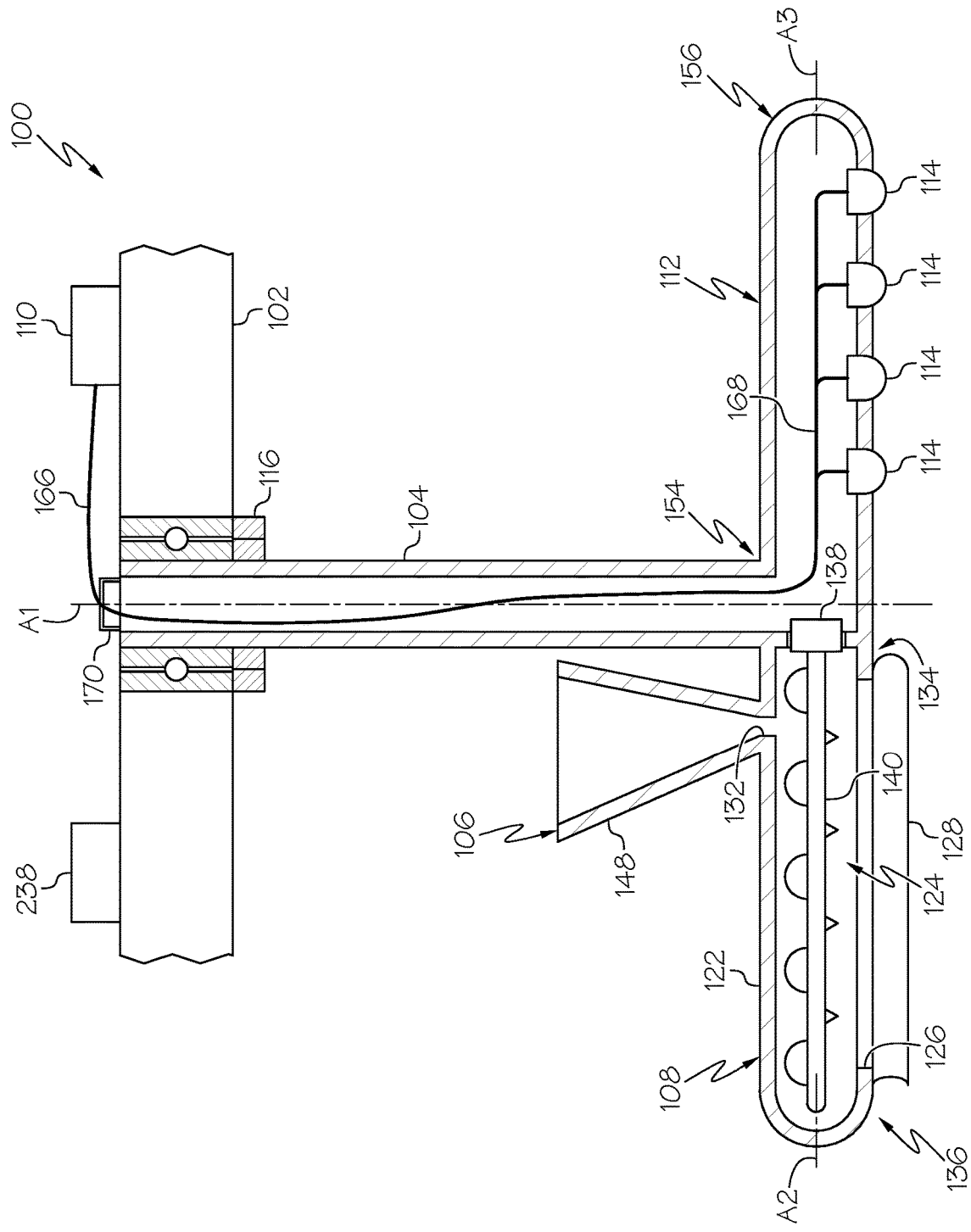

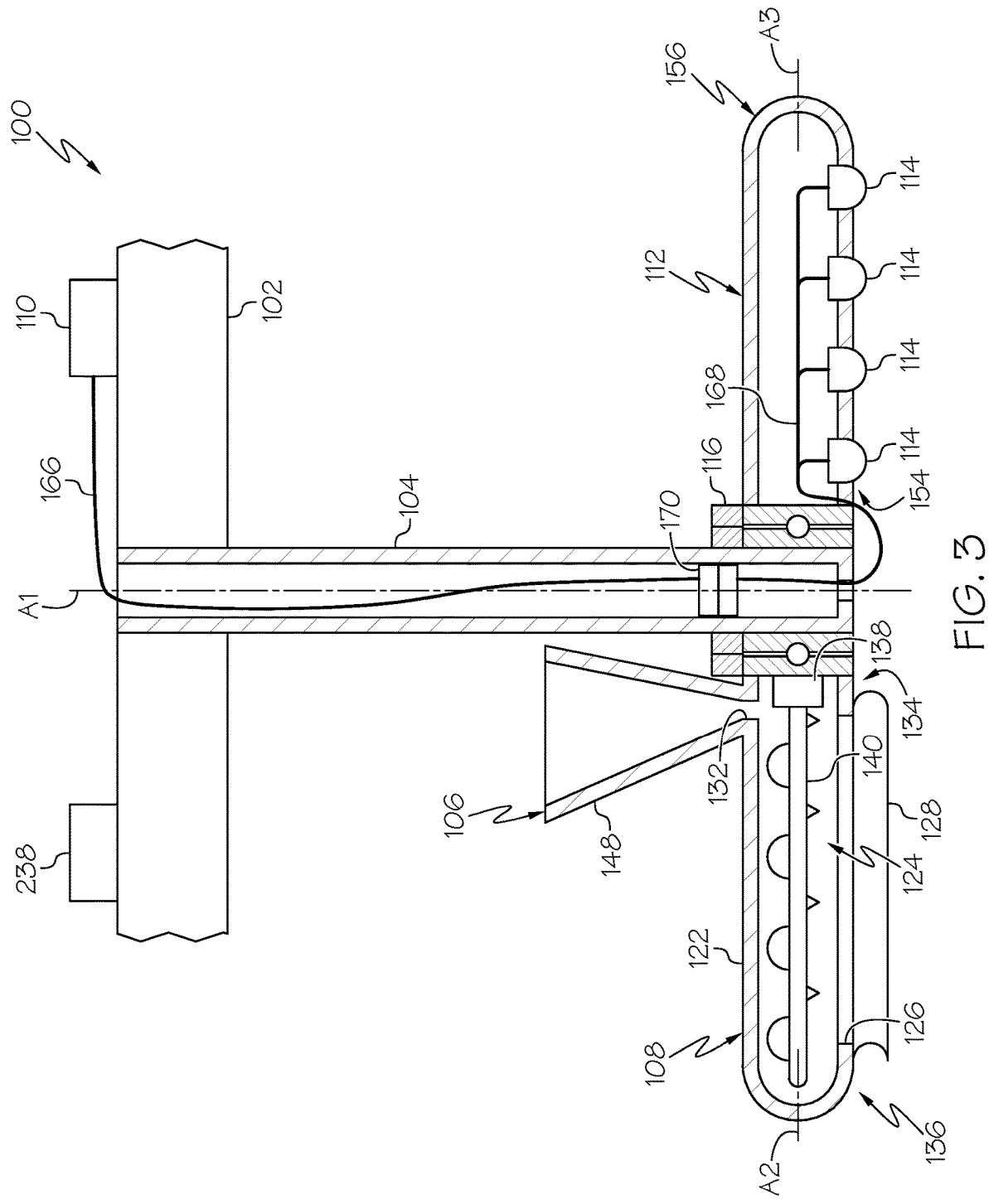

METHODS FOR ADDITIVELY MANUFACTURING AN OBJECT FROM A POWDER MATERIAL

TECHNICAL FIELD

The present disclosure relates to additive-manufacturing apparatuses and methods for additively manufacturing an object from a powder material.

BACKGROUND

Conventional powder-bed additive-manufacturing devices utilize various processing techniques to deposit, distribute, and consolidate powder material. For example, the powder material is typically distributed in a powder bed using a distribution arm that moves linearly relative to the powder bed. Following distribution of the powder material, a portion of the powder material is consolidated using an appropriate type of energy emitter, which moves separately from the distribution arm, to form a layer of an additively manufactured object. However, such additive-manufacturing devices have limited processing speed and are require complex control systems.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is an additive-manufacturing apparatus, which comprises a support and a powder-material source. The additive-manufacturing apparatus also comprises a powder-supply arm, having a powder-supply-arm central axis A2. The powder-supply arm comprises a hollow body, having an interior volume that is in communication with the powder-material source such that a powder material can be transferred from the powder-material source to the interior volume. The powder-supply arm also comprises a powder-deposition opening in the hollow body. The powder-deposition opening has a width W and is in communication with the interior volume of the hollow body such that the powder material can be transferred out of the interior volume through the powder-deposition opening. The powder-supply arm further comprises a powder-distribution blade, coupled to the hollow body and extending along the powder-deposition opening. The additive-manufacturing apparatus also comprises an energy source and an energy-supply arm, having an energy-supply-arm central axis A3. The additive-manufacturing apparatus further comprises energy emitters, coupled to the energy-supply arm. The energy emitters are configured to be in one of electrical or optical communication with the energy source. The additive-manufacturing apparatus additionally comprises a rotary drive, configured to rotate the powder-supply arm and the energy-supply arm about a vertical axis A1, passing through the support, and intersecting the powder-supply-arm central axis A2 and the energy-supply-arm central axis A3.

The additive-manufacturing apparatus enables substantially continuous (e.g., uninterrupted) deposition, distribution, and consolidation of the powder material as the powder-supply arm and the energy-supply arm rotate about the vertical axis A1, which improves processing speeds of an additive-manufacturing operation by eliminating the need for back and forth motion and, thus, the corresponding acceleration and deceleration of components during deposition, distribution, and consolidation of the powder material.

Also disclosed herein is a method of additively manufacturing an object from a powder material. The method comprises discharging the powder material from a powder-deposition opening in a hollow body of a powder-supply arm, while rotating the powder-supply arm and an energy-supply arm about a vertical axis A1. The method also comprises, while rotating the powder-supply arm and the energy-supply arm about the vertical axis A1, distributing the powder material within a powder-bed volume using a powder-distribution blade that is coupled to the hollow body and extends along the powder-deposition opening. The method further comprises, while rotating the powder-supply arm and the energy-supply arm about the vertical axis A1, consolidating at least a portion of the powder material in the powder-bed volume using energy emitters, coupled to the energy-supply arm.

The method enables substantially continuous (e.g., uninterrupted) deposition, distribution, and consolidation of the powder material as the powder-supply arm and the energy-supply arm rotate about the vertical axis A1, which improves processing speeds of additively manufacturing by eliminating the need for back and forth motion and, thus, the corresponding acceleration and deceleration of components during deposition, distribution, and consolidation of the powder material.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 2 is a schematic, elevation, sectional view of the additive-manufacturing apparatus of FIGS. 1A and 1B, according to one or more examples of the subject matter, disclosed herein;

FIG. 3 is a schematic, elevation, sectional view of the additive-manufacturing apparatus of FIGS. 1A and 1B, according to one or more examples of the subject matter, disclosed herein;

DETAILED DESCRIPTION

Figure 1A:
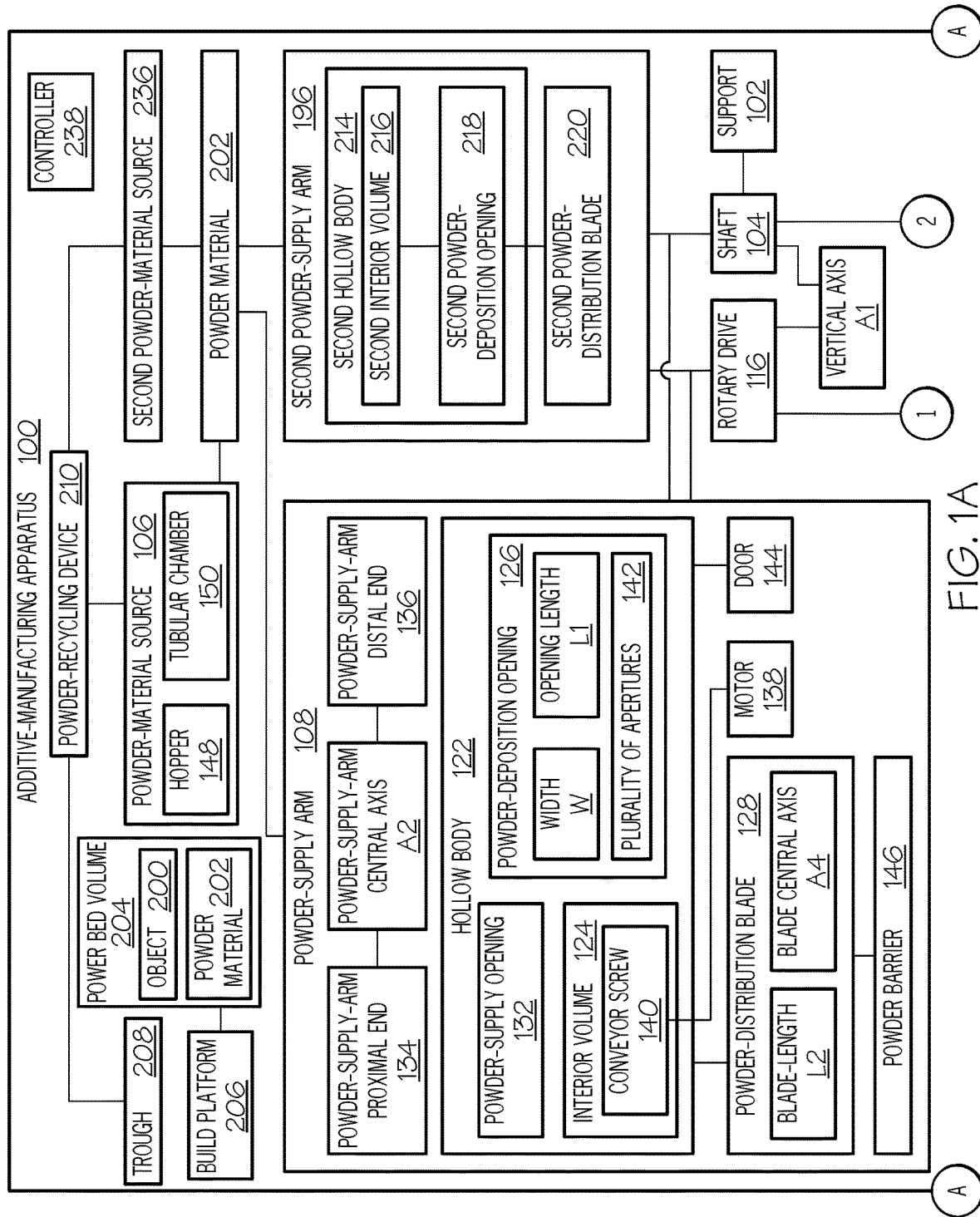
FIGS. 1A and 1B, collectively, are a block diagram of an additive-manufacturing apparatus, according to one or more examples of the subject matter, disclosed herein.
Figure 1B:
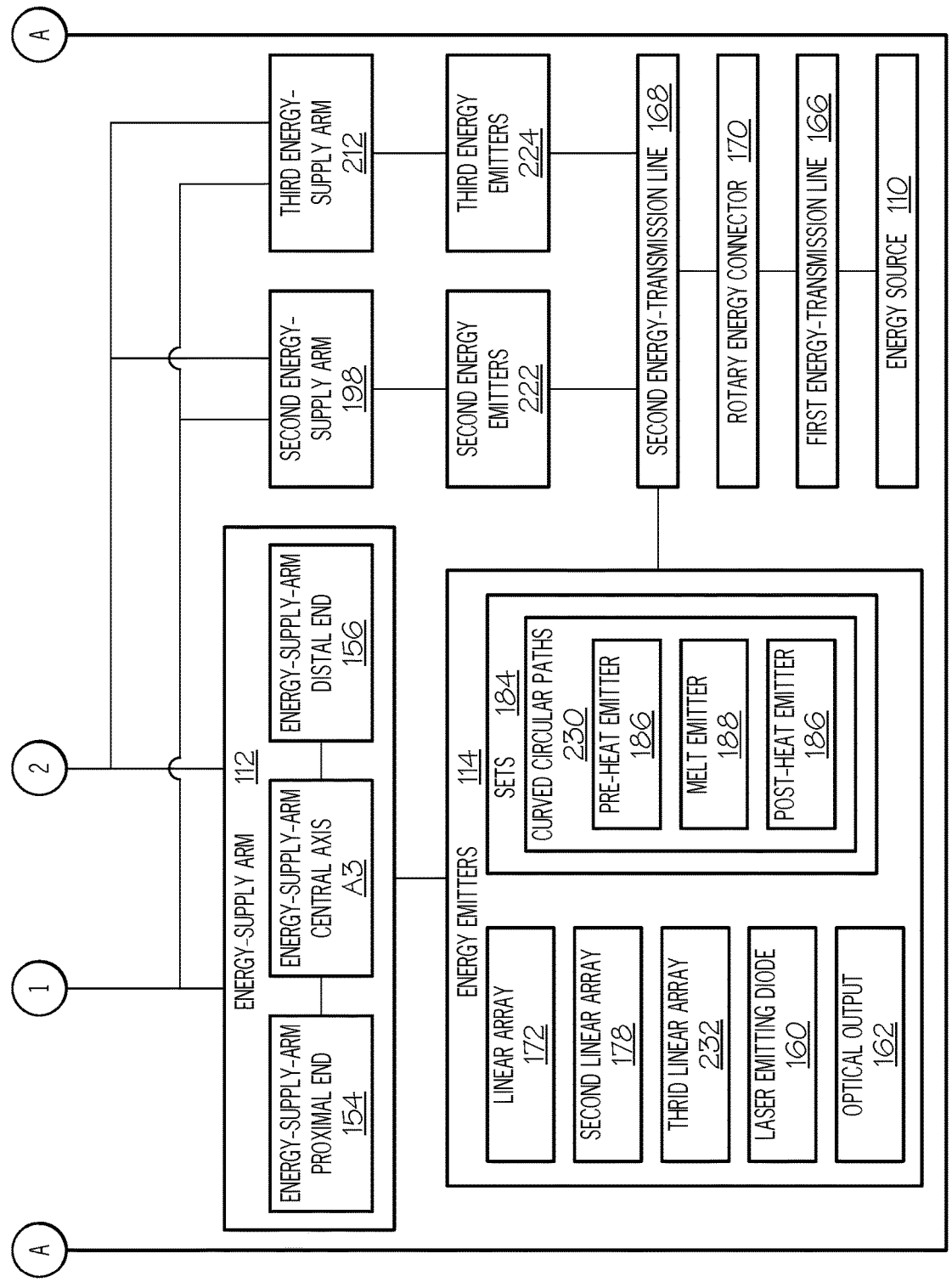

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

Figure 35:
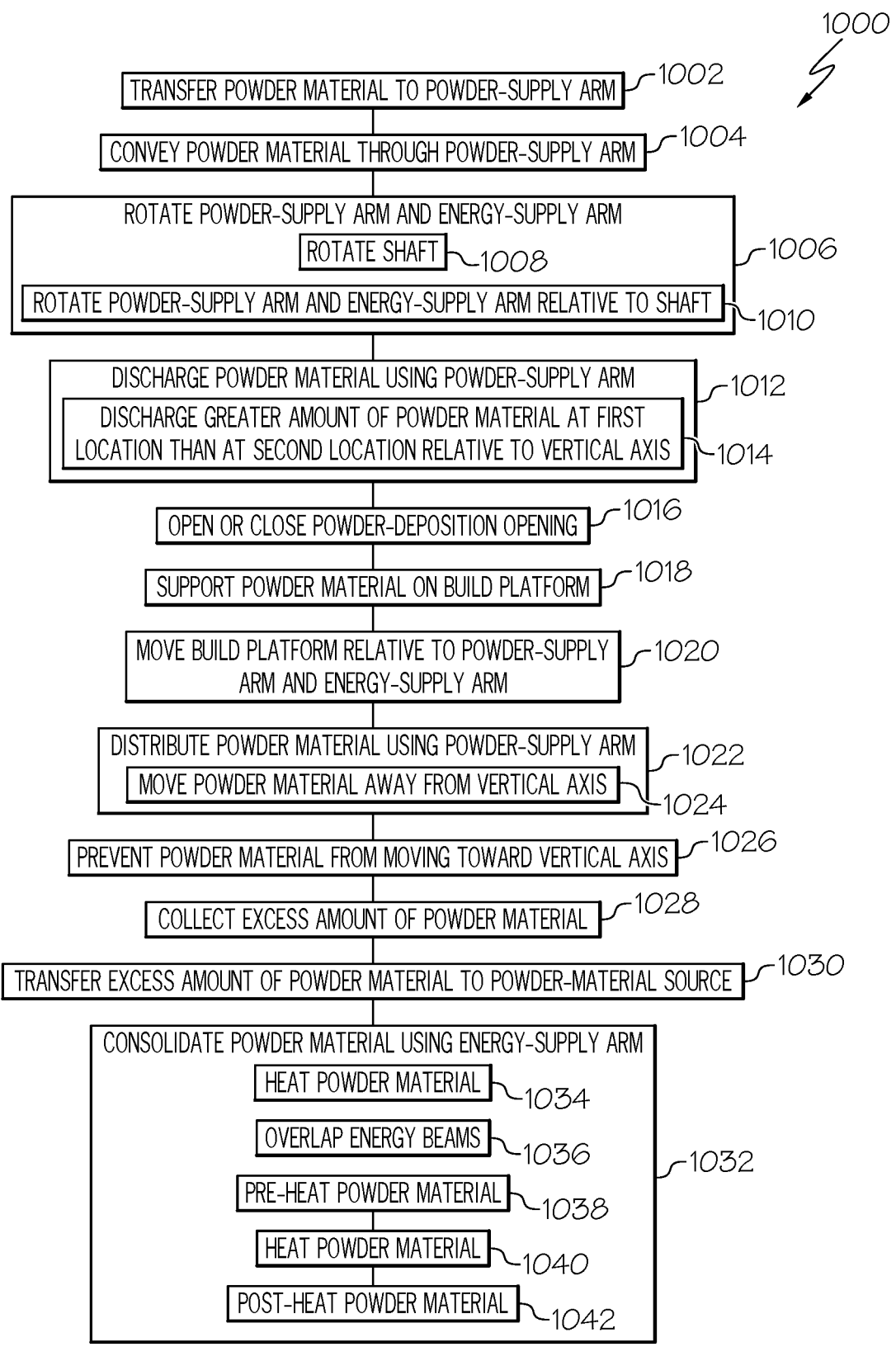
FIG. 35 is a block diagram of a method, according to one or more examples of the subject matter, disclosed herein, of additively manufacturing an object from a powder material utilizing the additive-manufacturing apparatus of FIGS. 1A and 1B, according to one or more examples of the subject matter, disclosed herein.
Figure 36:
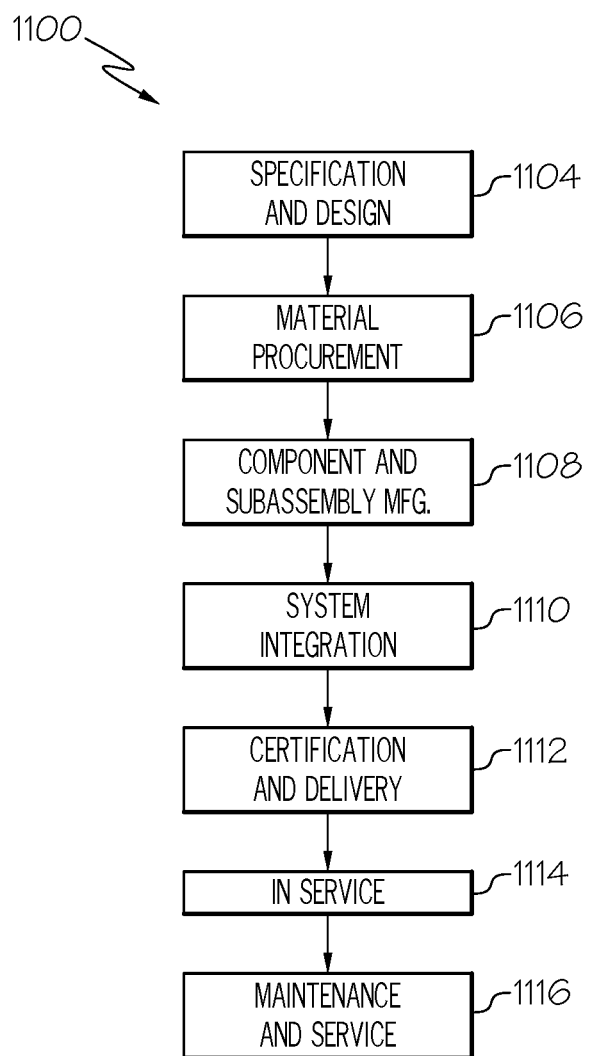
FIG. 36 is a block diagram of aircraft production and service methodology.

In FIGS. 35 and 36, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 35 and 36 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIGS. 1A and 1B and particularly to, e.g., FIGS. 2-34 for illustrative purposes only and not by way of limitation, additive-manufacturing apparatus 100 is disclosed. Additive-manufacturing apparatus 100 comprises support 102 and powder-material source 106. Additive-manufacturing apparatus 100 further comprises powder-supply arm 108, having powder-supply-arm central axis A2. Powder-supply arm 108 comprises hollow body 122, having interior volume 124 that is in communication with powder-material source 106 such that powder material 202 can be transferred from powder-material source 106 to interior volume 124. Powder-supply arm 108 also comprises powder-deposition opening 126 in hollow body 122. Powder-deposition opening 126 has width W and is in communication with interior volume 124 of hollow body 122 such that powder material 202 can be transferred out of interior volume 124 through powder-deposition opening 126. Powder-supply arm 108 further comprises powder-distribution blade 128, coupled to hollow body 122 and extending along powder-deposition opening 126. Additive-manufacturing apparatus 100 also comprises energy source 110 and energy-supply arm 112, having energy-supply-arm central axis A3. Additive-manufacturing apparatus 100 additionally comprises energy emitters 114, coupled to energy-supply arm 112. Energy emitters 114 are configured to be in one of electrical or optical communication with energy source 110. Additive-manufacturing apparatus 100 further comprises rotary drive 116, configured to rotate powder-supply arm 108 and energy-supply arm 112 about vertical axis A1, passing through support 102, and intersecting powder-supply-arm central axis A2 and energy-supply-arm central axis A3. The preceding portion of this paragraph characterizes example 1 of the subject matter, disclosed herein.

Additive-manufacturing apparatus 100 enables substantially continuous (e.g., uninterrupted) deposition, distribution, and consolidation of at least a portion of powder material 202 as powder-supply arm 108 and energy-supply arm 112 rotate about vertical axis A1, which improves processing speeds for an additive manufacturing operation by eliminating changes in direction (e.g., a need for linear, back and forth motion) and, thus, corresponding acceleration and deceleration of the operative components of additive-manufacturing apparatus 100 during deposition, distribution, and consolidation of powder material 202.

Additive-manufacturing apparatus 100 is configured to beneficially facilitate a reduction in time and energy associated with additively manufacturing object 200 from powder material 202, which, in turn, increases the overall efficiency of additive-manufacturing apparatus 100. Additive-manufacturing apparatus 100 is further configured to beneficially facilitate the automated deposition, distribution, and consolidation of powder material 202 to form object 200.

Object 200 is any three-dimensional object, made using additive-manufacturing apparatus 100 and in accordance with method 1000, that is built from a computer-aided design (CAD) model by successively adding material layer-by-layer. In one or more examples, object 200 is any one of a structure, a component, a part, an assembly, and a sub-assembly of an aircraft (e.g., aircraft 1102, FIG. 37).

Powder material 202 is any one of various types of suitable additive manufacturing powders. In one or more examples, powder material 202 is a metallic powder or a metallic alloy powder, including, but not limited to, cobalt, copper, Inconel, nickel, precious metals (e.g., gold, silver, platinum), stainless steel, tantalum, titanium, tool steel, tungsten, and combinations thereof. In one or more examples, powder material 202 is a thermoplastic powder or other polymer-based powder, including, but not limited to, acetal, acrylic, acrylonitrile butadiene styrene (ABS), acrylonitrile styrene acrylate (ASA), high impact polystyrene (HIPS), nylon, polycarbonate (PC), polyether ether ketone (PEEK), polyethylene terephthalate (PET), polyethylene trimethylene terephthalate (PETT), polyethylene terephthalate glycol-modified (PETG), polylactic acid (PLA), polypropylene (PP), polyvinyl alcohol (PVA), thermoplastic elastomer (TPE), polyetherimide, and combinations thereof.

Figure 26:
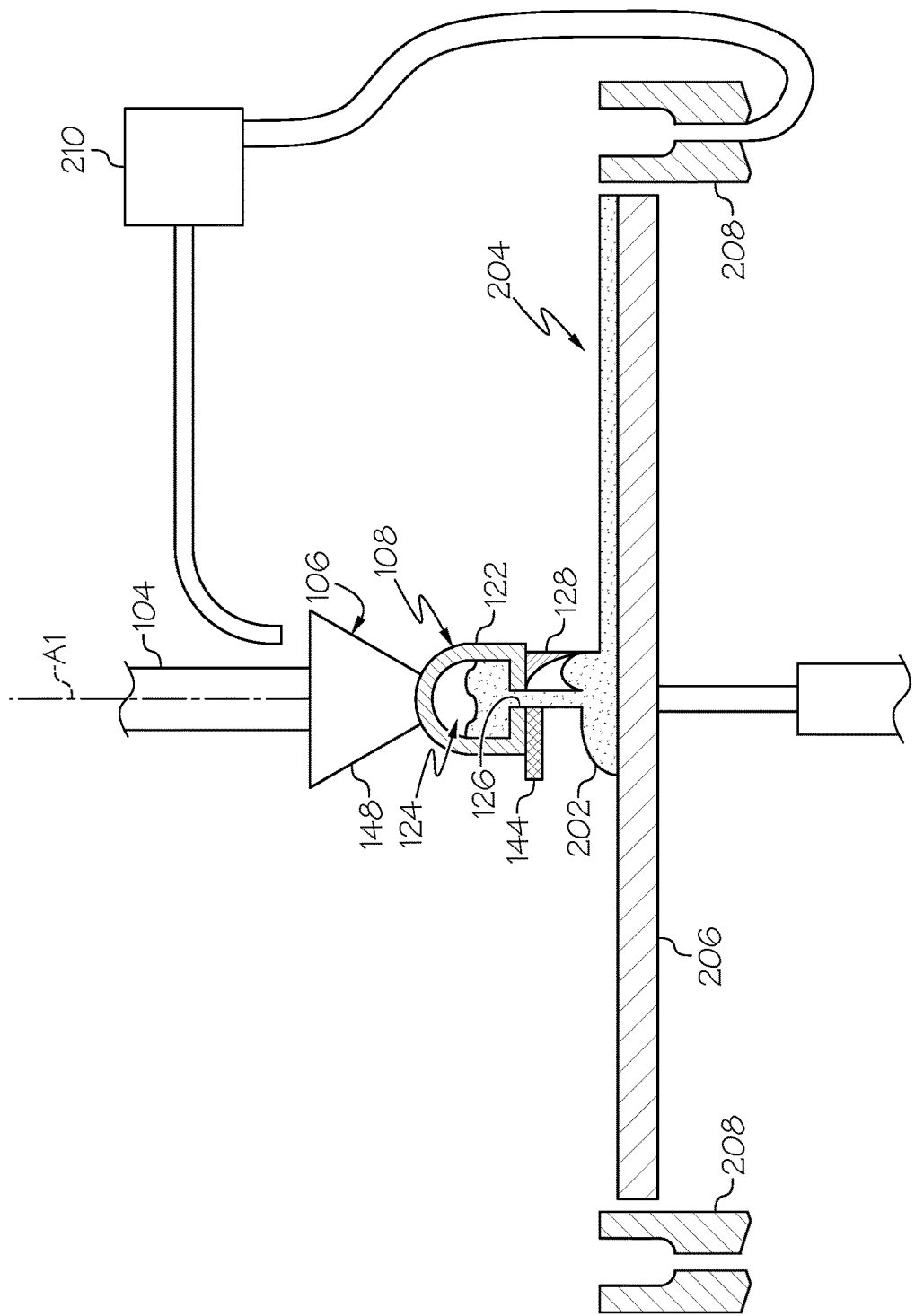
FIG. 26 is a schematic, elevation, sectional view of the additive-manufacturing apparatus of FIGS. 1A and 1B, according to one or more examples of the subject matter, disclosed herein.
Figure 27:
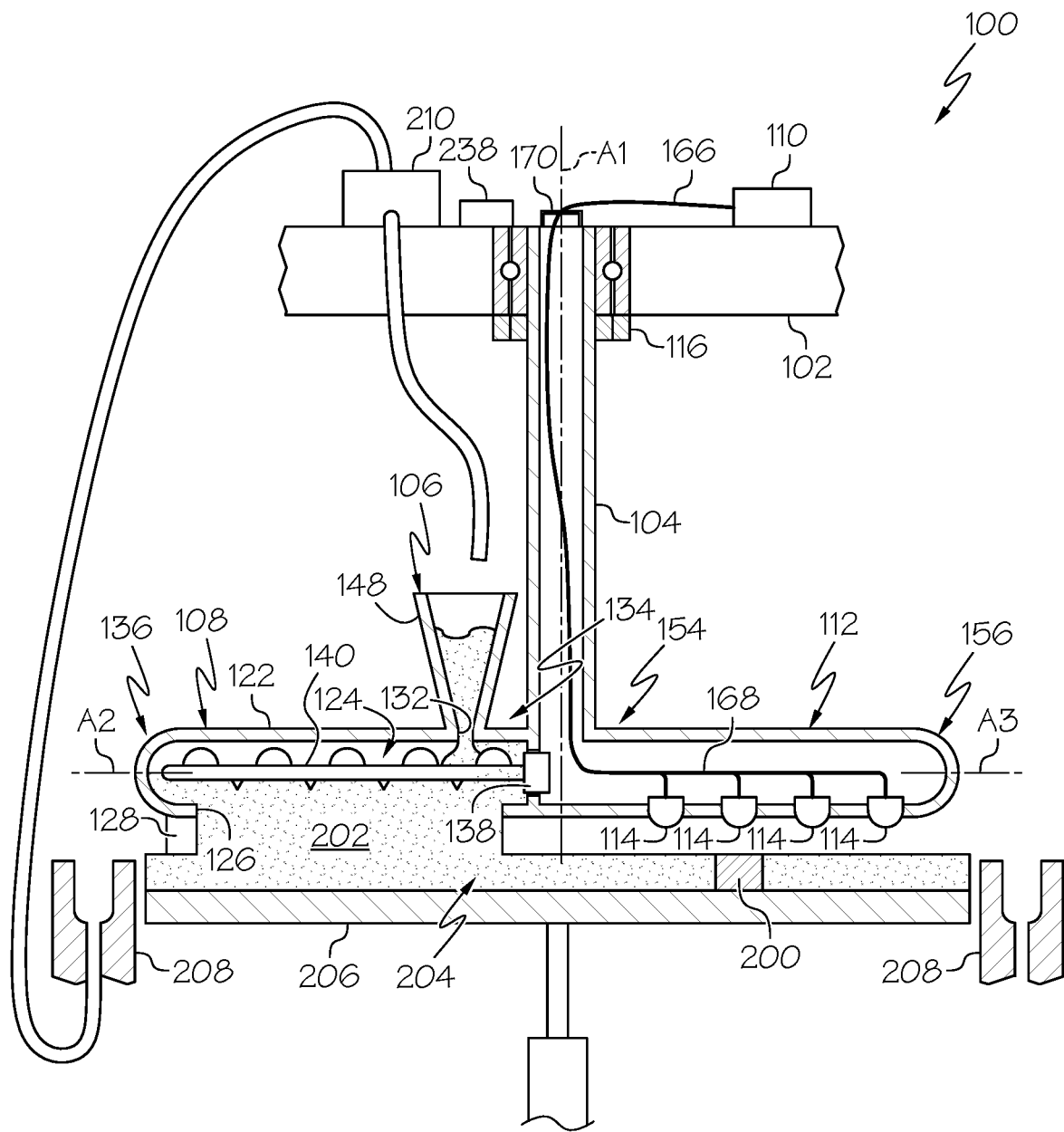
FIG. 27 is a schematic, elevation, sectional view of the additive-manufacturing apparatus of FIGS. 1A and 1B, according to one or more examples of the subject matter, disclosed herein.
Figure 28:
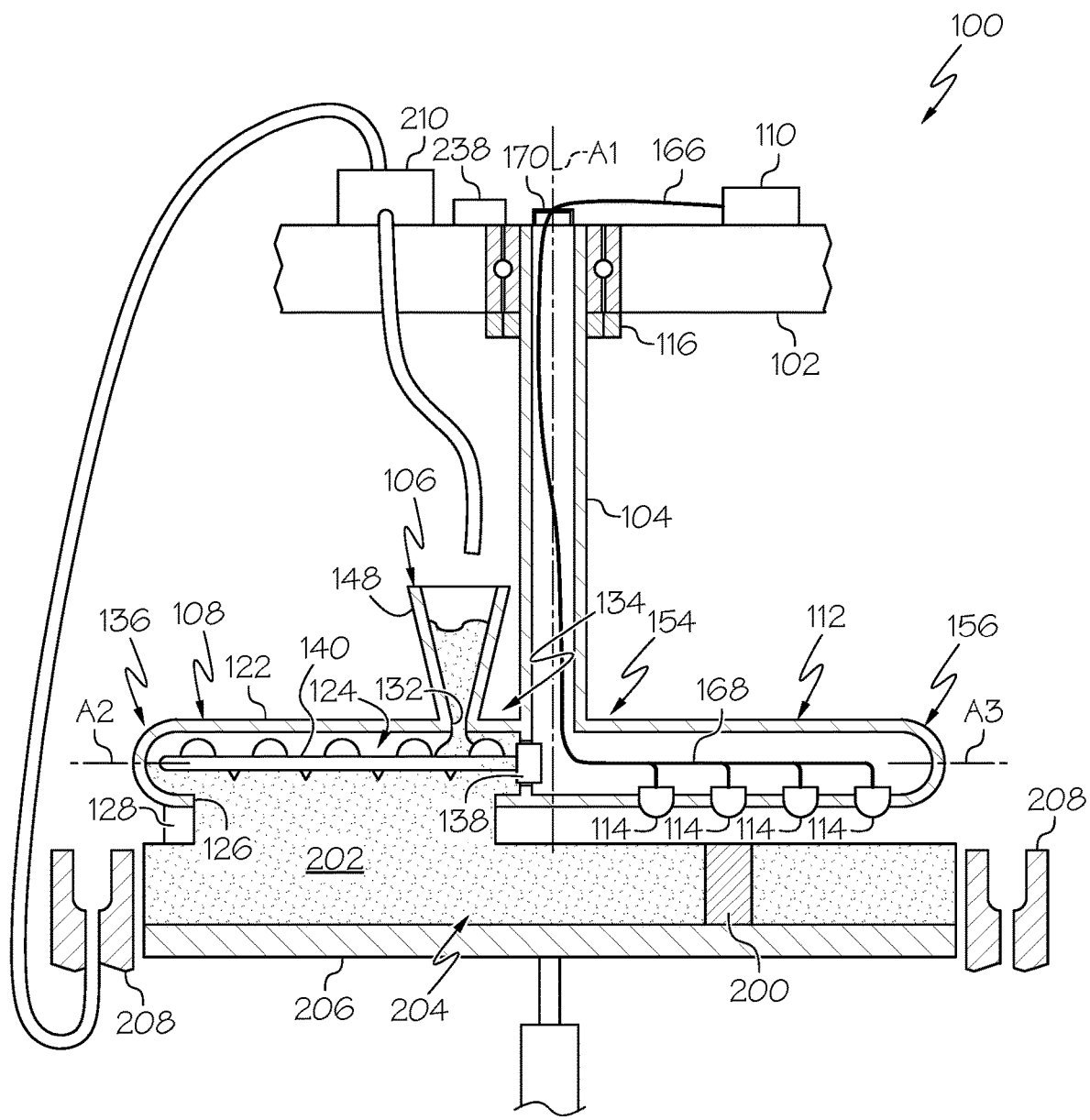
FIG. 28 is a schematic, elevation, sectional view of the additive-manufacturing apparatus of FIGS. 1A and 1B, according to one or more examples of the subject matter, disclosed herein.

Support 102 is any suitable support structure that is configured to hold powder-supply arm 108 and energy-supply arm 112 and that is configured to permit rotation of powder-supply arm 108 and energy-supply arm 112 about vertical axis A1. In one or more examples, support 102 is an overhead support structure that is configured to hold powder-supply arm 108 and energy-supply arm 112 in a horizontal orientation, for example, above powder-bed volume 204 (FIGS. 26-28). In one or more examples, support 102 includes, or takes the form of, an overhead gantry. In one or more examples, support 102 includes, or takes the form of, an overhead platform.

As used herein, relative terms, such as horizontal, vertical, parallel, perpendicular, and the like, include a circumstance in which items are exactly the stated condition and a circumstance in which items are approximately the stated condition. As used herein, the term "approximately" refers to a condition that is close to, but not exactly, the stated condition that still performs the desired function or achieves the desired result, such as a condition that is within an acceptable predetermined tolerance or accuracy. For example, the term "approximately" refers to a condition that is within 10% of the stated condition. However, the term "approximately" does not exclude a condition that is exactly the stated condition.

In one or more examples, powder-material source 106 includes any suitable container that is configured to store a volume of powder material 202 for use in the additive manufacturing process. Powder material 202 can be fresh powder material or recycled powder material. Powder-material source 106 is also configured to transfer powder material 202 to powder-supply arm 108. In one or more examples, powder-material source 106 includes a powder-transfer mechanism that is in communication with interior volume 124 of hollow body 122 of powder-supply arm 108 and that is configured to convey or otherwise feed powder material 202 to interior volume 124 of hollow body 122.

In one or more examples, powder-deposition opening 126 extends along powder-supply-arm central axis A2. Powder-deposition opening 126 is configured to discharge powder material 202 so that when powder-supply arm 108 rotates about vertical axis A1, powder material 202 is deposited to powder-bed volume 204 (FIG. 1A) from interior volume 124 of hollow body 122 through powder-deposition opening 126. Powder-deposition opening 126 has any one of various shapes, viewed along vertical axis A1. Width W of powder-deposition opening 126 has any suitable dimension. It can be appreciated that the shape and/or width W of powder-deposition opening 126 may depend on the type of powder material 202, a desired rate of discharge for powder material 202, the rotational speed of powder-supply arm 108, and the like.

Powder-distribution blade 128 is configured to distribute powder material 202, discharged from powder-deposition opening 126 so that when powder-supply arm 108 rotates about vertical axis A1, powder material 202 is substantially evenly moved throughout powder-bed volume 204. Powder-distribution blade 128 is also configured to smooth powder material 202 for subsequent consolidation using energy emitters 114. In one or more examples, powder-distribution blade 128 extends downwardly from hollow body 122 and includes a smoothing edge, located opposite to hollow body 122.

Energy source 110 is configured to generate and/or supply energy to energy emitters 114. In one or more examples, energy source 110 is configured to supply electrical energy (e.g., electricity) to energy emitters 114. In such examples, energy source 110 includes, or takes the form of, any suitable electric generator or other electrical supply. In one or more examples, energy source 110 is configured to supply optical energy (e.g., laser light) to energy emitters 114. In such examples, energy source 110 includes, or takes the form of, any suitable laser.

Energy emitters 114 are configured to consolidate powder material 202. As used herein, the terms "consolidate," "consolidation," "consolidating," and similar terms refer to heating a portion of powder material 202 to fuse it together and form a solid. Each one of energy emitters 114 is configured to generate and/or emit energy beam 228 (FIGS. 29 and 30) so that when energy-supply arm 112 rotates about vertical axis A1, energy emitters 114 selectively consolidate a portion of powder material 202 to form a portion of object 200. In one or more examples, each one of energy emitters 114 is selectively controlled or actuated so that energy beam 228 is emitted at a predetermined location or for a predetermined period during rotation of energy-supply arm 112 about vertical axis A1. In one or more examples, energy beam 228 takes the form of a beam of optical energy (e.g., a laser beam) or a beam of electrical energy (e.g., an electron beam). In one or more examples, consolidating powder material 202 includes fully melting a portion of powder material 202 using energy beam 228, such as by selective laser melting or electron-beam melting. In such examples, each one of energy emitters 114 is configured to generate and/or emit a laser beam or an electron beam to consolidate powder material 202. In one or more examples, consolidating powder material 202 includes sintering powder material using energy beam 228, such as by selective laser sintering. In such examples, each one of energy emitters 114 is configured to emit a laser beam to consolidate powder material 202.

Rotary drive 116 includes any suitable drive mechanism configured to rotate powder-supply arm 108 and energy-supply arm 112 about vertical axis A1. In one or more examples, rotary drive 116 is configured to simultaneously rotate powder-supply arm 108 and energy-supply arm 112 about vertical axis A1. In one or more examples, rotary drive 116 is configured to independently rotate powder-supply arm 108 and energy-supply arm 112 about vertical axis A1. As used herein, the terms "rotate," "rotating," "rotation," and similar terms refer to movement of a body around an axis and includes a condition in which the axis extends through a center of mass of the body (e.g., rotate), a condition in which the axis extends through the body, but not through the center of mass of the body (e.g., gyrate), and a condition in which the axis does not extend through the body (e.g., revolve).

In one or more examples, rotary drive 116 is configured to continuously rotate powder-supply arm 108 and energy-supply arm 112 about vertical axis A1 relative to support 102. Continuous rotation of powder-supply arm 108 and energy-supply arm 112 about vertical axis A1 improves processing time and efficiency by eliminating changes in direction and corresponding periods of acceleration and deceleration that are associated with conventional powder distribution and consolidation techniques.

Figure 4:
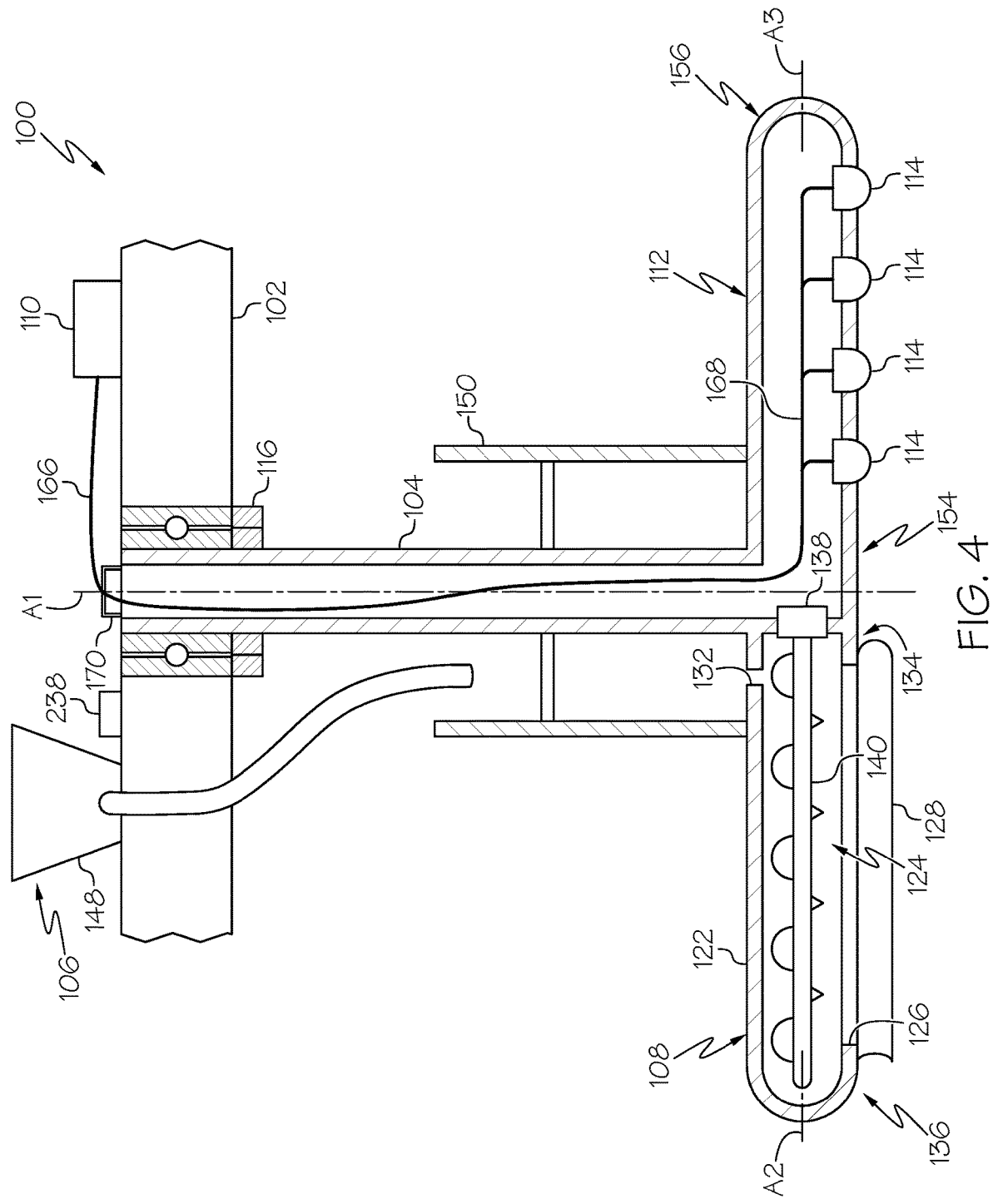
FIG. 4 is a schematic, elevation, sectional view of the additive-manufacturing apparatus of FIGS. 1A and 1B, according to one or more examples of the subject matter, disclosed herein.

Referring generally to FIGS. 1A and 1B and particularly to, e.g., FIGS. 2-4 for illustrative purposes only and not by way of limitation, rotary drive 116 is configured to rotate powder-supply arm 108 and energy-supply arm 112 about vertical axis A1 at a constant speed. The preceding portion of this paragraph characterizes example 2 of the subject matter, disclosed herein, where example 2 also encompasses example 1, above.

Continuous rotation of powder-supply arm 108 and energy-supply arm 112 at a constant speed (e.g., at a constant angular velocity) further improves processing time and efficiency by eliminating acceleration and deceleration associated with changes in speed. Rotation of energy-supply arm 112 and, thus, energy emitters 114 at a constant speed also simplifies command and control of actuation of energy emitters 114.

Rotation of energy-supply arm 112 enables energy emitters 114 to be located using a Polar coordinate system. For example, throughout rotation of energy-supply arm 112 about vertical axis A1, a two-dimensional location of each one of energy emitters 114 is determined by a distance from a reference point and an angle from a reference direction. Thus, with energy-supply arm 112 rotating at a constant speed, the location of each one of energy emitters 114 can be easily calculated and accurately predicted at any time during formation of object 200 (e.g., during the additive manufacturing process used to form object 200). In one or more examples, one or more of energy emitters 114 is selectively actuated at a predetermined time or for a predetermined period based on the location of energy-supply arm 112 during rotation of energy-supply arm 112 to consolidate a portion of powder material 202.

Referring generally to FIGS. 1A and 1B and particularly to, e.g., 27-30, in one or more examples, additive-manufacturing apparatus 100 includes controller 238. In one or more examples, controller 238 includes, or takes the form of, a suitable computing device that is in communication with and that is configured to control one or more operational components of additive-manufacturing apparatus 100 and to execute one or more computing or processing operations of the additive manufacturing process. In one or more examples, controller 238 includes at least one processor that is configured to execute program instructions, such as software instructions loaded onto memory (e.g., a non-transitory computer-readable storage medium).

In one or more examples, controller 238 is in communication with and controls at least a portion of the operational functions of rotary drive 116. For example, controller 238 is configured to control activation of rotary drive 116 and to set the speed of rotation of powder-supply arm 108 and energy-supply arm 112.

In one or more examples, controller 238 is in communication with and controls at least a portion of the operational functions of powder-material source 106. For example, controller 238 is configured to control a feed rate of powder material 202 from powder-material source 106 to interior volume 124 of hollow body 122 of powder-supply arm 108.

In one or more examples, controller 238 is in communication with and controls at least a portion of the operational functions of energy source 110. For example, controller 238 is configured to control activation of energy source 110 and the operative parameters (e.g., electrical or optical output) of energy source 110.

In one or more examples, controller 238 is in communication with and controls at least a portion of the operational functions of energy emitters 114. In one or more examples, controller 238 is configured to selectively actuate each one of energy emitters 114 so that energy beam 228 consolidates a portion of powder material 202 at a predetermined location in powder-bed volume 204 (FIGS. 29 and 30) during rotation of energy-supply arm 112. In one or more examples, controller 238 is configured to a power level of energy emitters 114 during rotation of energy-supply arm 112.

It can be appreciated that energy emitters 114 located farther from vertical axis A1 rotate about vertical axis A1 faster than energy emitters 114 located closer to vertical axis A1 during rotation of energy-supply arm 112 about vertical axis A1. Generally, the rotational speed of energy emitters 114 increases proportionally to a distance from vertical axis A1. Therefore, portions of powder material 202 located farther from vertical axis A1 receive energy or are heated for lesser period than portions of powder material 202 located closer to vertical axis A1 during rotation of energy-supply arm 112. Accordingly, in one or more examples, a first power level of energy emitters 114 located farther from vertical axis A1 is greater than a second power level of energy emitters 114 located closer to vertical axis A1 so that a first energy deposited to a portion of powder material 202 located farther from vertical axis A1 is greater than a second energy deposited to a portion of powder material 202 located closer to vertical axis A1. Generally, the power level of energy emitters 114 increases proportionally to a distance from vertical axis A1.

Referring generally to FIGS. 1A and 1B and particularly to, e.g., FIGS. 2-5, 8, 11-19, 22, 26-28, 31, and 34 for illustrative purposes only and not by way of limitation, additive-manufacturing apparatus 100 further comprises shaft 104, coupled to support 102. Powder-supply arm 108 and energy-supply arm 112 are coupled to shaft 104. The preceding portion of this paragraph characterizes example 3 of the subject matter, disclosed herein, where example 3 also encompasses example 1 or 2, above.

Shaft 104 structurally supports powder-supply arm 108 and energy-supply arm 112 while rotating about vertical axis A1.

Shaft 104 is any suitable structure that is capable of supporting powder-supply arm 108 and energy-supply arm 112 and that is configured to permit rotation of powder-supply arm 108 and energy-supply arm 112 about vertical axis A1. In one or more examples, shaft 104 includes, or takes the form of, a relatively straight, elongated body that extends from support 102. In one or more examples, each one of powder-supply arm 108 and energy-supply arm 112 is coupled to an end of shaft 104, opposite to support 102.

In one or more examples, vertical axis A1 passes through shaft 104, such as through a center of mass of shaft 104.

Referring generally to FIGS. 1A and 1B and particularly to, e.g., FIGS. 2, 4, 27, and 28 for illustrative purposes only and not by way of limitation, powder-supply arm 108 and energy-supply arm 112 are fixed to shaft 104 so that powder-supply arm 108 and energy-supply arm 112 are not rotatable and are not translatable relative to shaft 104. Rotary drive 116 is configured to rotate shaft 104 about vertical axis A1 relative to support 102. The preceding portion of this paragraph characterizes example 4 of the subject matter, disclosed herein, where example 4 also encompasses example 3, above.

Rotation of shaft 104 relative to support 102 rotates powder-supply arm 108 and energy-supply arm 112 about vertical axis A1.

In one or more examples, shaft 104 is coupled to and is rotatable relative to support 102. In one or more examples, a bearing is located between and is coupled to support 102 and shaft 104, which enables shaft 104 to rotate about vertical axis A1 relative to support 102. In one or more examples, rotary drive 116 is coupled to the bearing. Activation of rotary drive 116 rotates shaft 104 about vertical axis A1 relative to support 102.

Referring generally to FIGS. 1A and 1B and particularly to, e.g., FIG. 3 for illustrative purposes only and not by way of limitation, rotary drive 116 is configured to rotate powder-supply arm 108 and energy-supply arm 112 about vertical axis A1 relative to shaft 104. The preceding portion of this paragraph characterizes example 5 of the subject matter, disclosed herein, where example 5 also encompasses example 3, above.

Rotation of powder-supply arm 108 and energy-supply arm 112 relative to shaft 104 rotates powder-supply arm 108 and energy-supply arm 112 about vertical axis A1.

In one or more examples, shaft 104 is coupled to and is fixed relative to support 102. Each one of powder-supply arm 108 and energy-supply arm 112 is coupled to and is rotatable relative to shaft 104. In one or more examples, the bearing is located between and is coupled to shaft 104 and powder-supply arm 108 and energy-supply arm 112, which enables powder-supply arm 108 and energy-supply arm 112 to rotate about vertical axis A1 relative to shaft 104. In one or more examples, rotary drive 116 is coupled to the bearing. Activation of rotary drive 116 rotates powder-supply arm 108 and energy-supply arm 112 about vertical axis A1 relative to shaft 104.

Referring generally to FIGS. 1A and 1B and particularly to, e.g., FIGS. 2-4, 27, and 28 for illustrative purposes only and not by way of limitation, powder-supply arm 108 further comprises conveyor screw 140, located within interior volume 124 of hollow body 122 and extending along powder-deposition opening 126. Powder-supply arm 108 also comprises motor 138, configured to rotate conveyor screw 140. The preceding portion of this paragraph characterizes example 6 of the subject matter, disclosed herein, where example 6 also encompasses any one of examples 1 to 5, above.

Rotation of conveyor screw 140 facilitates movement of powder material 202 throughout interior volume 124 of hollow body 122 along powder-supply-arm central axis A2, for example, from a proximal end of powder-supply arm 108 to a distal end of powder-supply arm 108.

Conveyor screw 140 is any suitable screw conveyor mechanism that uses rotation of a helical screw blade to move powder material 202 along powder-supply-arm central axis A2 in a direction away from vertical axis A1. In one or more examples, conveyor screw 140 is a shaftless, or centerless, screw conveyor. In one or more examples, conveyor screw 140 is an auger. Motor 138 is any suitable rotary drive mechanism that is coupled to and that is configured to rotate conveyor screw 140 about an axis of rotation relative to hollow body 122.

Alternatively, additive-manufacturing apparatus 100 may use a different means of conveying powder material 202 throughout interior volume 124 of hollow body 122 along powder-supply-arm central axis A2. In one or more examples, additive-manufacturing apparatus 100 includes a positive pressure system or blower mechanism to move powder material 202 throughout hollow body 122. In one or more examples, additive-manufacturing apparatus 100 uses centrifugal force acting on powder material 202 during rotation of powder-supply arm 108 to move powder material 202 throughout hollow body 122.

Figure 11:
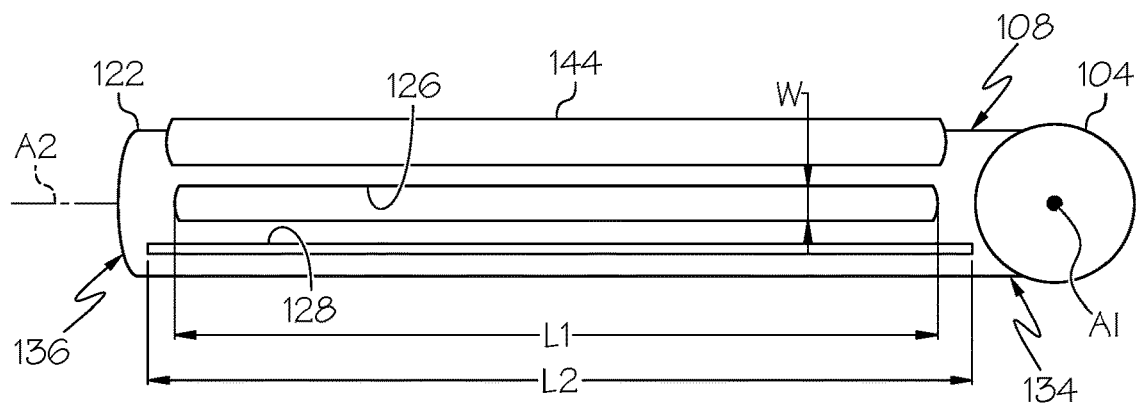
FIG. 11 is a schematic, bottom plan view of a sub-assembly of the additive-manufacturing apparatus of FIGS. 1A and 1B, according to one or more examples of the subject matter, disclosed herein.
Figure 13:
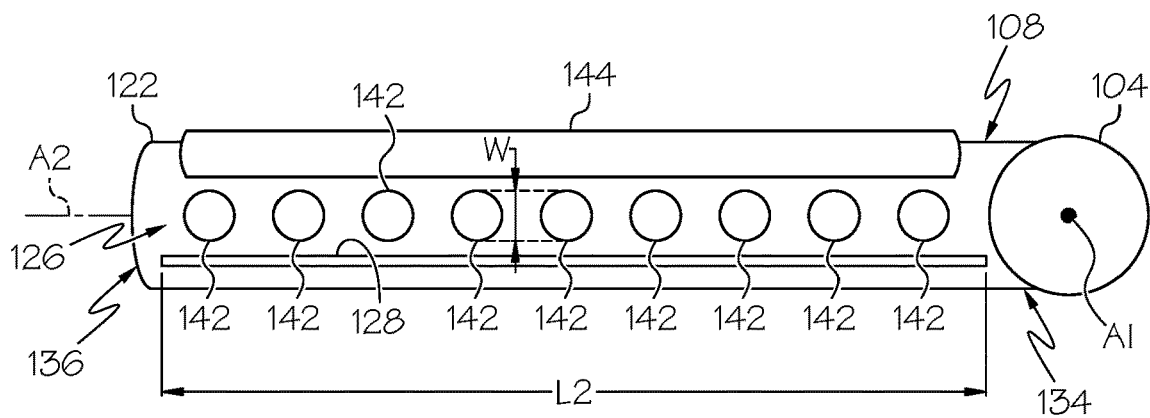
FIG. 13 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIGS. 11 and 13 for illustrative purposes only and not by way of limitation, width W of powder-deposition opening 126 is constant along powder-supply-arm central axis A2. The preceding portion of this paragraph characterizes example 7 of the subject matter, disclosed herein, where example 7 also encompasses any one of examples 1 to 6, above.

Width W of powder-deposition opening 126 being constant along powder-deposition opening 126 facilitates deposition of approximately equal amounts of powder material 202 closer to vertical axis A1 and farther from vertical axis A1.

Width W being constant refers to width W of powder-deposition opening 126 being approximately the same at each location along powder-deposition opening 126, for example, from a proximal end of powder-deposition opening 126, located adjacent to vertical axis A1, to a distal end of powder-deposition opening 126, opposite to the proximal end and spaced away from vertical axis A1. During rotation of powder-supply arm 108 about vertical axis A1, powder material 202 is discharged from interior volume 124 of hollow body 122 through powder-deposition opening 126. The constant width W of powder-deposition opening 126 enables approximately the same amount of powder material 202 to be discharged along the length of powder-deposition opening 126, resulting in approximately equal amounts of powder material 202 being deposited to powder-bed volume 204 at locations closer to vertical axis A1 and locations farther from vertical axis A1.

Figure 12:
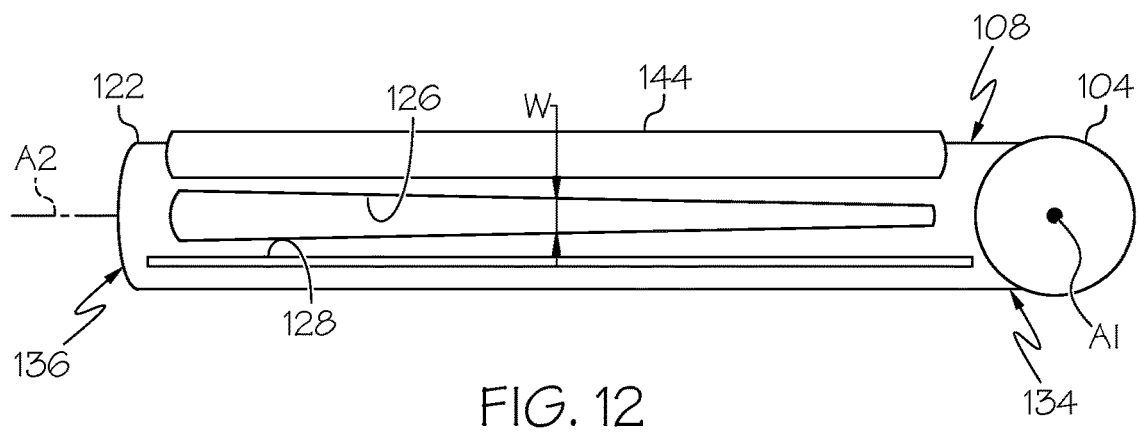
FIG. 12 is a schematic, bottom plan view of a sub-assembly of the additive-manufacturing apparatus of FIGS. 1A and 1B, according to one or more examples of the subject matter, disclosed herein.
Figure 14:
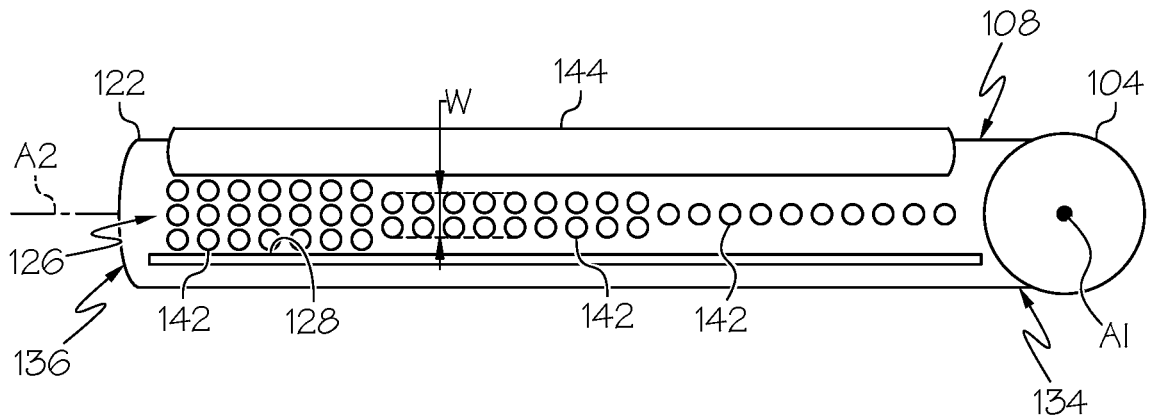
FIG. 14 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIGS. 12 and 14 for illustrative purposes only and not by way of limitation, width W of powder-deposition opening 126 increases in a direction along powder-supply-arm central axis A2 and away from vertical axis A1. The preceding portion of this paragraph characterizes example 8 of the subject matter, disclosed herein, where example 8 also encompasses any one of examples 1 to 6, above.

Width W of powder-deposition opening 126 increasing in a direction along powder-supply arm central axis A2 and away from vertical axis A1 facilitates deposition of a lesser amount of powder material 202 closer to vertical axis A1 and deposition of a greater amount of powder material 202 farther from vertical axis A1.

Width W increasing refers to width W of powder-deposition opening 126 being smaller at location at or near the proximal end of powder-deposition opening 126 and larger at locations at or near the distal end of powder-deposition opening 126. The increasing width W of powder-deposition opening 126 enables increasing amounts of powder material 202 to be discharged along the length of powder-deposition opening 126, resulting in lesser amounts of powder material 202 being deposited to powder-bed volume 204 at locations closer to vertical axis A1 and greater amounts of powder material 202 being deposited to powder-bed volume 204 at locations farther from vertical axis A1.

In one or more examples, width W of powder-deposition opening 126 increases proportionally to a distance from vertical axis A1. Accordingly, the amount of powder material 202 discharged from powder-deposition opening 126 and, thus, the amount of powder material 202 deposited to powder-bed volume 204 increases proportionally to a distance from vertical axis A1.

It can be appreciated that a relative surface area of powder-bed volume 204 is larger at locations farther from vertical axis A1 as compared to the surface area of powder-bed volume 204 at locations closer to vertical axis A1. As such, it is beneficial to deposit larger amounts of powder material 202 at locations farther from vertical axis A1. Larger amounts of powder material 202 being deposited in directions extending away from vertical axis A1 provides a sufficient amount of powder material 202 to adequately and evenly cover powder-bed volume 204 when distributing powder material 202 using powder-distribution blade 128 during rotation of powder-supply arm 108.

Referring generally to FIGS. 1A and 1B and particularly to, e.g., FIGS. 6, 7, 9-12, 15-17, 24, 25, and 31-33 for illustrative purposes only and not by way of limitation, powder-deposition opening 126 is continuous and extends along powder-supply-arm central axis A2. The preceding portion of this paragraph characterizes example 9 of the subject matter, disclosed herein, where example 9 also encompasses any one of examples 1 to 8, above.

Powder-deposition opening 126 being continuous and extending along powder-supply-arm central axis A2 facilitates deposition of an approximately continuous amount of powder material 202 in a direction, extending away from vertical axis A1.

An approximately continuous amount of powder material 202 being deposited to powder-bed volume 204 in a direction, extending away from vertical axis A1, provides substantially continuous coverage of powder material 202 and reduces reliance on powder-distribution blade 128 to evenly distribute powder material 202 during rotation of powder-supply arm 108. In one or more examples, powder-deposition opening 126 is a continuous, elongated opening or slot formed in hollow body 122.

Referring generally to FIGS. 1A and 1B and particularly to, e.g., FIGS. 13 and 14 for illustrative purposes only and not by way of limitation, powder-deposition opening 126 is plurality of apertures 142, extending along powder-supply-arm central axis A2. The preceding portion of this paragraph characterizes example 10 of the subject matter, disclosed herein, where example 10 also encompasses any one of examples 1 to 8, above.

Powder-deposition opening 126 being plurality of apertures 142, extending along powder-supply-arm central axis A2, facilitates deposition of discontinuous amounts of powder material 202 in a direction, extending away from vertical axis A1. Powder-deposition opening 126 being plurality of apertures 142 also increases the structural integratory of hollow body 122 as compared to powder-deposition opening 126 being a continuous, elongated opening.

In one or more examples, each one of plurality of apertures 142 is formed in hollow body 122 and is in communication with interior volume 124 of hollow body 122 such that a portion of powder material 202 can be transferred out of interior volume 124 through corresponding ones of plurality of apertures 142. Each one of plurality of apertures 142 has any one of various suitable geometries, for example, two-dimensional shape, viewed along vertical axis A1, and dimension. It can be appreciated that the geometry of plurality of apertures 142 may depend on the type of powder material 202, a desired rate of discharge for powder material 202, the rotational speed of powder-supply arm 108, and the like.

Referring generally to FIGS. 1A and 1B and particularly to, e.g., FIGS. 11-14, 26, and 31 for illustrative purposes only and not by way of limitation, powder-supply arm 108 further comprises door 144, coupled to hollow body 122. Door 144 is movable relative to hollow body 122 to at least partially open or to close powder-deposition opening 126. The preceding portion of this paragraph characterizes example 11 of the subject matter, disclosed herein, where example 11 also encompasses any one of examples 1 to 10, above.

Door 144 enables powder-deposition opening 126 to be selectively opened (e.g., partially or fully) and closed so that powder material 202 can be selectively discharged from powder-deposition opening 126 during rotation of powder-supply arm 108.

Door 144 includes, or takes the form of, any suitable body that is configured to selectively cover powder-deposition opening 126 and enclose interior volume 124 of hollow body 122. In one or more examples, door 144 extends along powder-deposition opening 126. In one or more examples, door 144 translates relative to hollow body 122 to at least partially open or to close powder-deposition opening 126. In one or more examples, door 144 rotates or pivots relative to hollow body 122 to at least partially open or to close powder-deposition opening 126.

In one or more examples, when door 144 is positioned relative to hollow body 122 of powder-supply arm 108 so that powder-deposition opening 126 is partially open, door 144 is configured to selectively control of width W of powder-deposition opening 126. Selective control of width W of powder-deposition opening 126 enables selective control of a rate of discharge of powder material 202 from powder-deposition opening 126 while rotating powder-supply arm 108 about vertical axis A1. It can be appreciated that it may be beneficial to adjust width of powder-deposition opening 126 for a given additive-manufacturing operation, for example, based on the type of powder material 202, a desired rate of discharge for powder material 202, the rotational speed of powder-supply arm 108, and the like.

Figure 31:
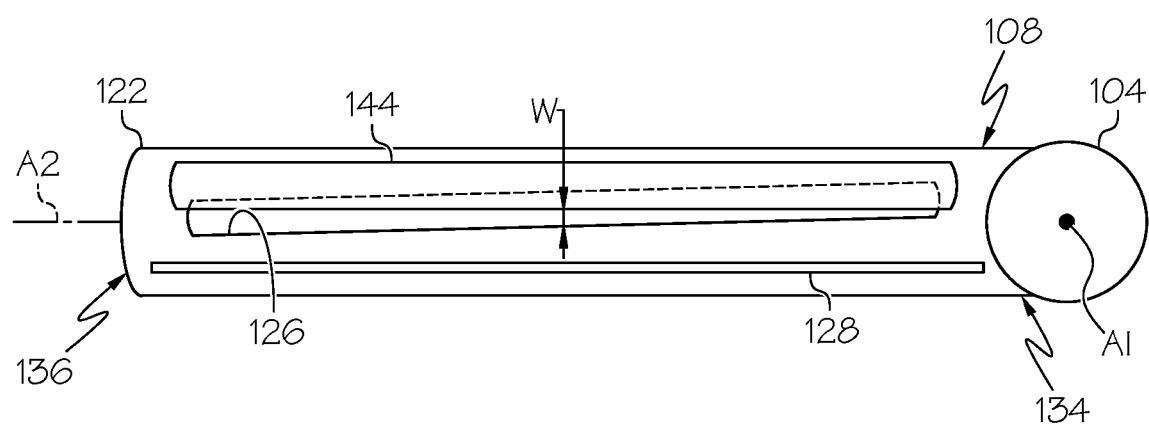
FIG. 31 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 31 for illustrative purposes only and not by way of limitation, when door 144 is positioned relative to hollow body 122 of powder-supply arm 108 so that powder-deposition opening 126 is partially open, width W of at least a portion of powder-deposition opening 126 increases along powder-supply-arm central axis A2 of powder-supply arm 108 in a direction away from vertical axis A1. The preceding portion of this paragraph characterizes example 12 of the subject matter, disclosed herein, where example 12 also encompasses example 11, above.

Positioning door 144 so that powder-deposition opening 126 is partially open enables width W of powder-deposition opening 126 to increase in a direction, extending away from vertical axis A1, to facilitate deposition of a lesser amount of powder material 202 closer to vertical axis A1 and deposition of a greater amount of powder material 202 farther from vertical axis A1.

In one or more examples, when door 144 is positioned relative to hollow body 122 of powder-supply arm 108 so that powder-deposition opening 126 is partially open, width W of powder-deposition opening 126 at a first location along powder-deposition opening 126 is greater than width W of powder-deposition opening 126 at a second location along powder-deposition opening 126 that is closer to vertical axis A1 than the first location. In one or more examples, when door 144 is positioned relative to hollow body 122 of powder-supply arm 108 so that powder-deposition opening 126 is partially open, width W of powder-deposition opening 126 increases proportionally to a distance from vertical axis A1.

Referring generally to FIGS. 1A and 1B and particularly to, e.g., FIGS. 11, 13, and 31 for illustrative purposes only and not by way of limitation, when door 144 is positioned relative to hollow body 122 of powder-supply arm 108 so that powder-deposition opening 126 is fully open, width W of powder-deposition opening 126 is constant along powder-supply-arm central axis A2. The preceding portion of this paragraph characterizes example 13 of the subject matter, disclosed herein, where example 13 also encompasses example 11 or 12, above.

Positioning door 144 so that powder-deposition opening 126 is fully open enables use of powder-deposition opening 126 having width W that is constant along powder-deposition opening 126 to facilitate deposition of approximately equal amounts of powder material 202 closer to vertical axis A1 and farther from vertical axis A1.

In one or more examples, when door 144 is positioned relative to hollow body 122 of powder-supply arm 108 so that powder-deposition opening 126 is fully open, width W of powder-deposition opening 126 at a first location along powder-deposition opening 126 is approximately the same as width W of powder-deposition opening 126 at a second location along powder-deposition opening 126 that is closer to vertical axis A1 than the first location.

Referring generally to FIGS. 1A and 1B and particularly to, e.g., FIGS. 12 and 14, in one or more examples, when door 144 is positioned relative to hollow body 122 of powder-supply arm 108 so that powder-deposition opening 126 is partially open, width W of at least a portion of powder-deposition opening 126 increases along powder-supply-arm central axis A2 of powder-supply arm 108 in a direction away from vertical axis A1.

Referring generally to FIGS. 1A and 1B and particularly to, e.g., FIG. 11 for illustrative purposes only and not by way of limitation, powder-deposition opening 126 has opening-length L1. Powder-distribution blade 128 has blade-length L2. Blade-length L2 is equal to or greater than opening-length L1. The preceding portion of this paragraph characterizes example 14 of the subject matter, disclosed herein, where example 14 also encompasses any one of examples 1 to 13, above.

Powder-distribution blade 128 being as long as or longer than powder-deposition opening 126 facilitates complete distribution of an amount of powder material 202 that is discharged from powder-deposition opening 126 during rotation of powder-supply arm 108 and energy-supply arm 112 about vertical axis A1.

Figure 32:
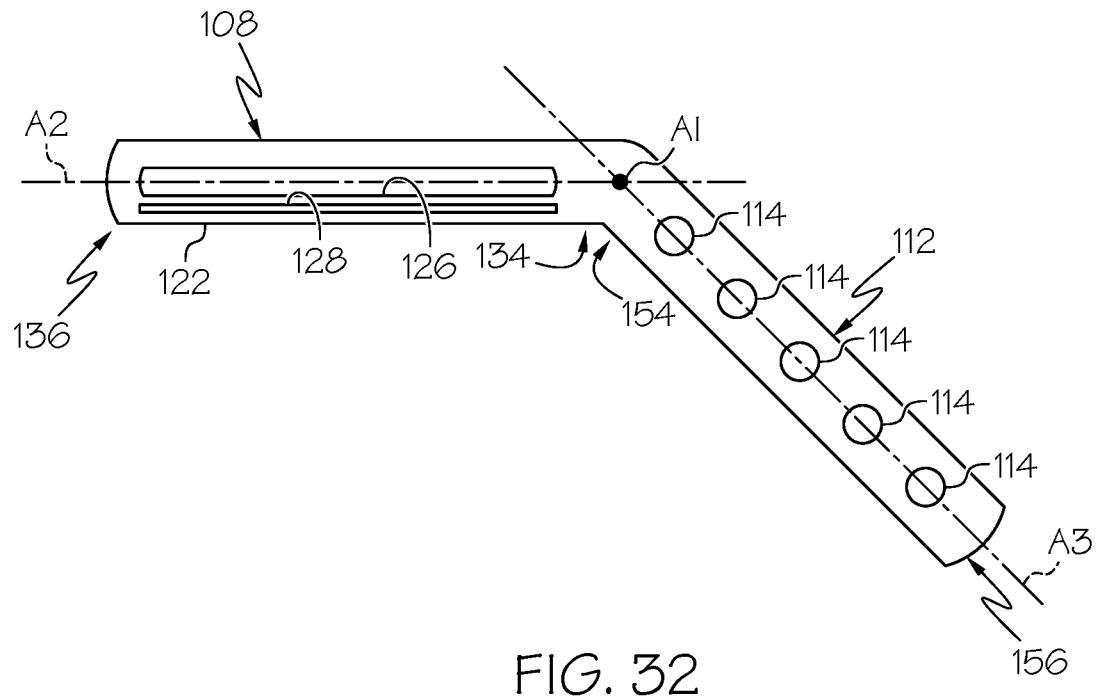
FIG. 32 is a schematic, bottom plan view of a sub-assembly of the additive-manufacturing apparatus of FIGS. 1A and 1B, according to one or more examples of the subject matter, disclosed herein.
Figure 33:
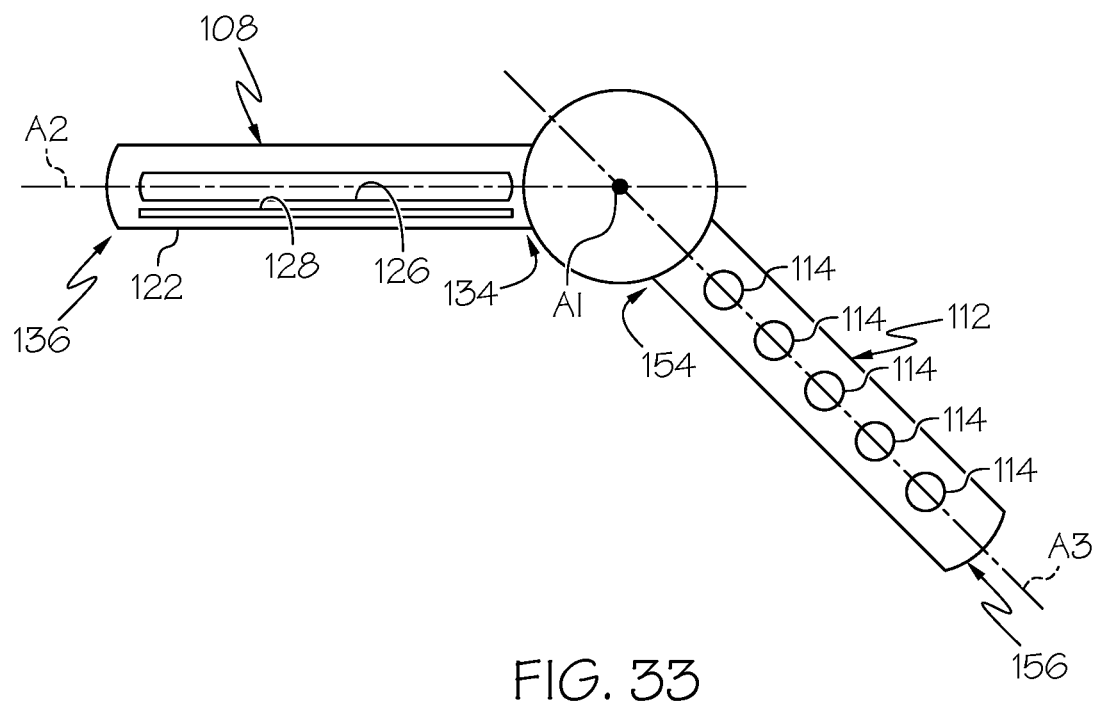
FIG. 33 is a schematic, bottom plan view of a sub-assembly of the additive-manufacturing apparatus of FIGS. 1A and 1B, according to one or more examples of the subject matter, disclosed herein.
Figure 34:
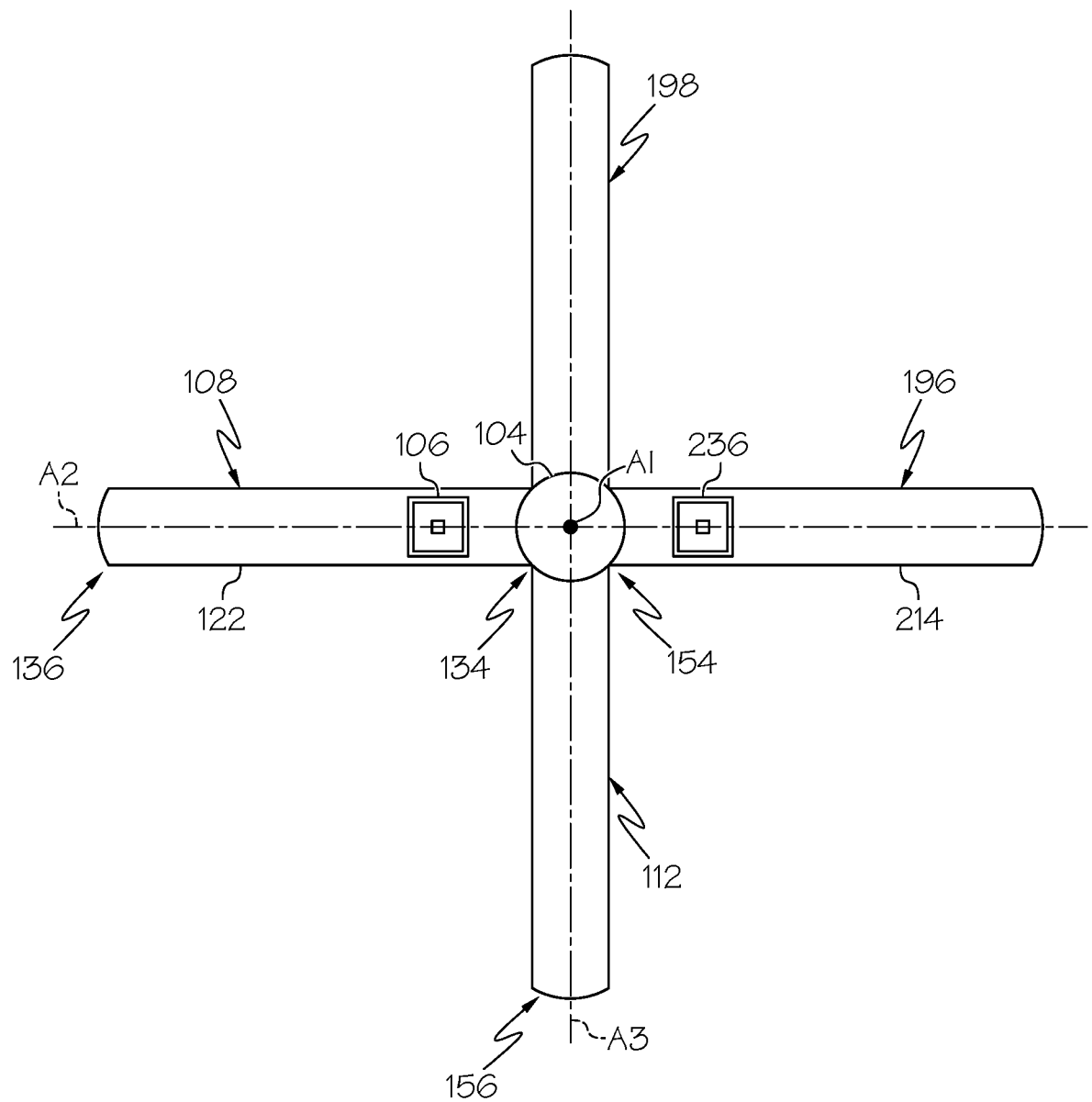
FIG. 34 is a schematic, top plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIGS. 32 and 33 for illustrative purposes only and not by way of limitation, powder-supply arm 108 has powder-supply-arm proximal end 134 and powder-supply-arm distal end 136, located opposite powder-supply-arm proximal end 134 along powder-supply-arm central axis A2. Energy-supply arm 112 has energy-supply-arm proximal end 154 and energy-supply-arm distal end 156, located opposite energy-supply-arm proximal end 154 along energy-supply-arm central axis A3. Powder-supply-arm central axis A2 and energy-supply-arm central axis A3 are oblique to each other, when viewed along vertical axis A1. The preceding portion of this paragraph characterizes example 15 of the subject matter, disclosed herein, where example 15 also encompasses any one of examples 1 to 14, above.

Powder-supply-arm central axis A2 and energy-supply-arm central axis A3 being oblique to each other angularly displaces powder-supply arm 108 and energy-supply arm 112 relative to each other during rotation of powder-supply arm 108 and energy-supply arm 112 about vertical axis A1.

In one or more examples, powder-supply-arm central axis A2 and energy-supply-arm central axis A3 being oblique to each other facilitates a delay between deposition and distribution of a layer of powder material 202 using powder-supply arm 108 and consolidation of a portion of the layer of powder material 202 using energy-supply arm 112 during rotation of powder-supply arm 108 and energy-supply arm 112 about vertical axis A1. In one or more examples, powder-supply-arm central axis A2 and energy-supply-arm central axis A3 being oblique to each other facilitates a delay between consolidation of a portion of a preceding layer of powder material 202 using energy-supply arm 112 and deposition and distribution of a subsequent layer of powder material 202 using powder-supply arm 108 during rotation of powder-supply arm 108 and energy-supply arm 112 about vertical axis A1.

Figure 7:
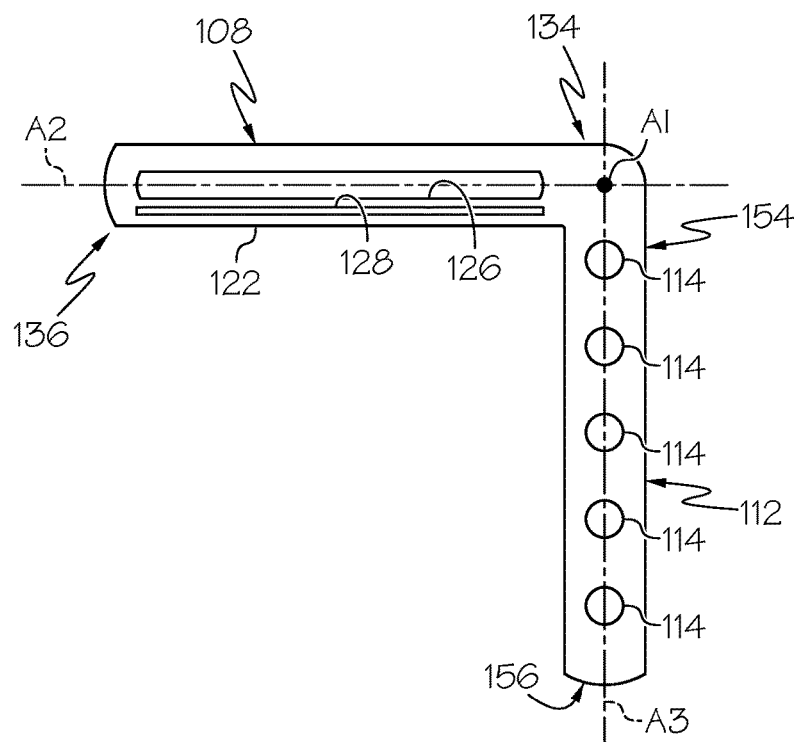
FIG. 7 is a schematic, bottom plan view of a sub-assembly of the additive-manufacturing apparatus of FIGS. 1A and 1B, according to one or more examples of the subject matter, disclosed herein.
Figure 10:
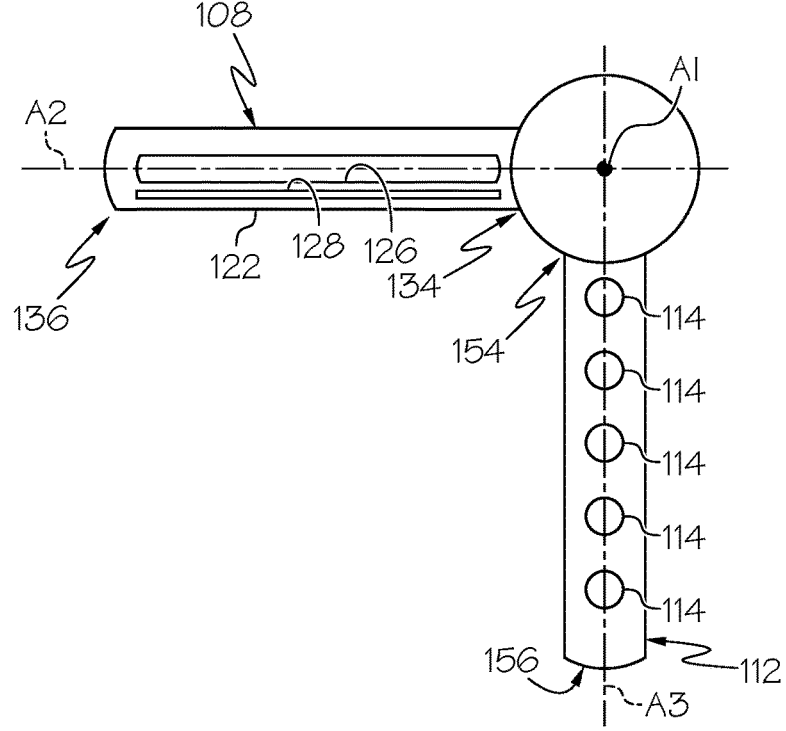
FIG. 10 is a schematic, bottom plan view of a sub-assembly of the additive-manufacturing apparatus of FIGS. 1A and 1B, according to one or more examples of the subject matter, disclosed herein.

Referring generally to FIGS. 1A and 1B—and particularly to, e.g., FIGS. 7 and 10 for illustrative purposes only and not by way of limitation, powder-supply arm 108 has powder-supply-arm proximal end 134 and powder-supply-arm distal end 136, located opposite powder-supply-arm proximal end 134 along powder-supply-arm central axis A2. Energy-supply arm 112 has energy-supply-arm proximal end 154 and energy-supply-arm distal end 156, located opposite energy-supply-arm proximal end 154 along energy-supply-arm central axis A3. Powder-supply-arm central axis A2 and energy-supply-arm central axis A3 are orthogonal to each other, when viewed along vertical axis A1. The preceding portion of this paragraph characterizes example 16 of the subject matter, disclosed herein, where example 16 also encompasses any one of examples 1 to 14, above.

Powder-supply-arm central axis A2 and energy-supply-arm central axis A3 being orthogonal to each other angularly displaces powder-supply arm 108 and energy-supply arm 112 relative to each other during rotation of powder-supply arm 108 and energy-supply arm 112 about vertical axis A1.

In one or more examples, powder-supply-arm central axis A2 and energy-supply-arm central axis A3 being orthogonal to each other facilitates a delay between deposition and distribution of a layer of powder material 202 using powder-supply arm 108 and consolidation of a portion of the layer of powder material 202 using energy-supply arm 112 during rotation of powder-supply arm 108 and energy-supply arm 112 about vertical axis A1. In one or more examples, powder-supply-arm central axis A2 and energy-supply-arm central axis A3 being orthogonal to each other facilitates a delay between consolidation of a portion of a preceding layer of powder material 202 using energy-supply arm 112 and deposition and distribution of a subsequent layer of powder material 202 using powder-supply arm 108 during rotation of powder-supply arm 108 and energy-supply arm 112 about vertical axis A1.

Figure 5:
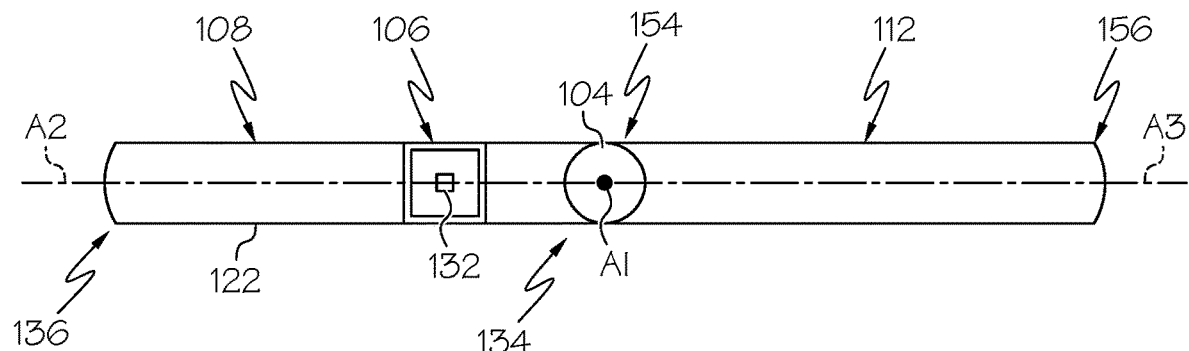
FIG. 5 is a schematic, top plan view of a sub-assembly of the additive-manufacturing apparatus of FIGS. 1A and 1B, according to one or more examples of the subject matter, disclosed herein.
Figure 6:
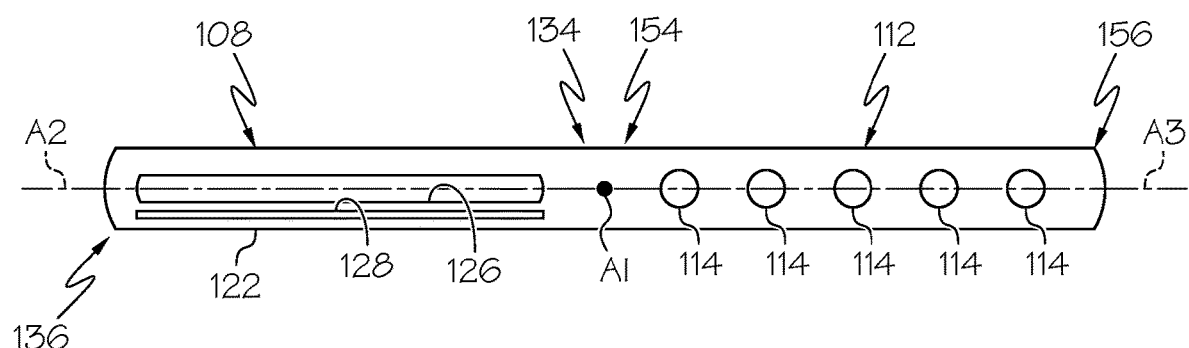
FIG. 6 is a schematic, bottom plan view of a sub-assembly of the additive-manufacturing apparatus of FIGS. 1A and 1B, according to one or more examples of the subject matter, disclosed herein.
Figure 8:
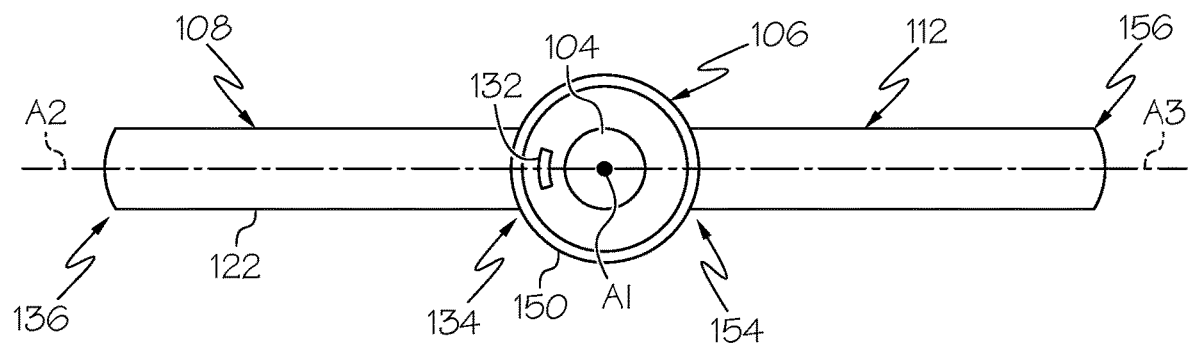
FIG. 8 is a schematic, top plan view of a sub-assembly of the additive-manufacturing apparatus of FIGS. 1A and 1B, according to one or more examples of the subject matter, disclosed herein.
Figure 9:
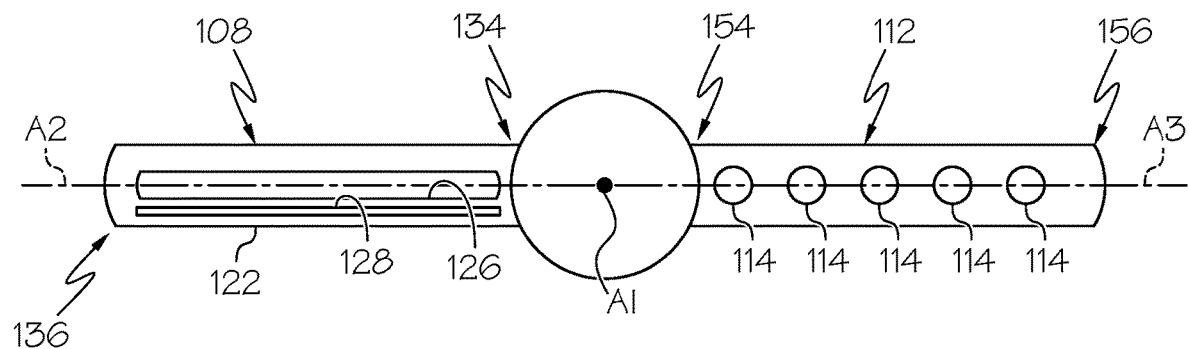
FIG. 9 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIGS. 5, 8, and 9 for illustrative purposes only and not by way of limitation, powder-supply arm 108 has powder-supply-arm proximal end 134 and powder-supply-arm distal end 136, located opposite powder-supply-arm proximal end 134 along powder-supply-arm central axis A2. Energy-supply arm 112 has energy-supply-arm proximal end 154 and energy-supply-arm distal end 156, located opposite energy-supply-arm proximal end 154 along energy-supply-arm central axis A3. Powder-supply-arm central axis A2 and energy-supply-arm central axis A3 are collinear with each other, when viewed along vertical axis A1, and powder-supply arm 108 and energy-supply arm 112 extend in opposite directions away from vertical axis A1. The preceding portion of this paragraph characterizes example 17 of the subject matter, disclosed herein, where example 17 also encompasses any one of examples 1 to 14, above.

Powder-supply-arm central axis A2 and energy-supply-arm central axis A3 being collinear with each other and extending in opposite directions away from vertical axis A1 angularly displaces powder-supply arm 108 and energy-supply arm 112 relative to each other during rotation of powder-supply arm 108 and energy-supply arm 112 about vertical axis A1.

In one or more examples, powder-supply-arm central axis A2 and energy-supply-arm central axis A3 being collinear with each other and extending in opposite directions away from vertical axis A1 facilitates a delay between deposition and distribution of a layer of powder material 202 using powder-supply arm 108 and consolidation of a portion of the layer of powder material 202 using energy-supply arm 112 during rotation of powder-supply arm 108 and energy-supply arm 112 about vertical axis A1. In one or more examples, powder-supply-arm central axis A2 and energy-supply-arm central axis A3 being collinear with each other and extending in opposite directions away from vertical axis A1 facilitates a delay between consolidation of a portion of a preceding layer of powder material 202 using energy-supply arm 112 and deposition and distribution of a subsequent layer of powder material 202 using powder-supply arm 108 during rotation of powder-supply arm 108 and energy-supply arm 112 about vertical axis A1.

Figure 15:
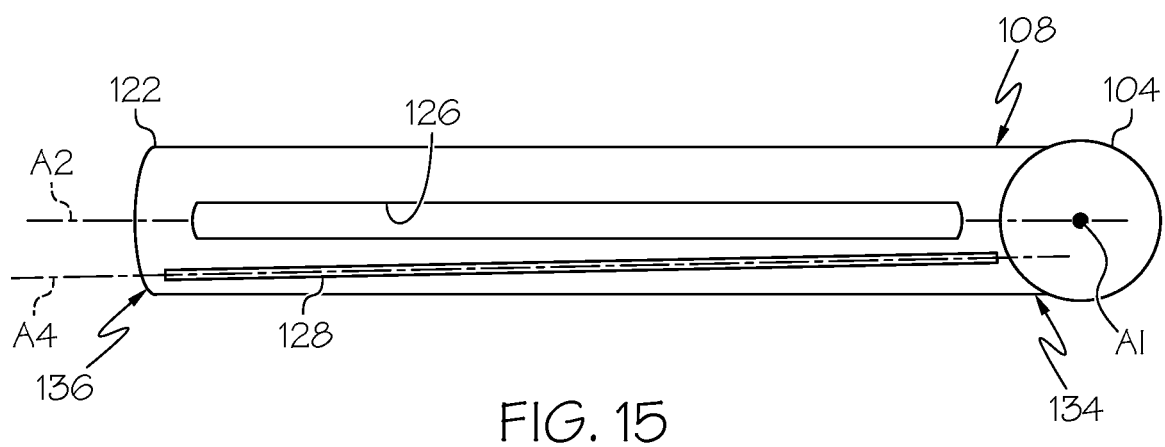
FIG. 15 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 15 for illustrative purposes only and not by way of limitation, powder-distribution blade 128 has blade central axis A4. Blade central axis A4 is oblique to powder-supply-arm central axis A2, when viewed along vertical axis A1. The preceding portion of this paragraph characterizes example 18 of the subject matter, disclosed herein, where example 18 also encompasses any one of examples 1 to 17, above.

Blade central axis A4 being oblique to powder-supply-arm central axis A2 facilitates movement of powder material 202 in a direction away from (e.g., radially outward relative to) vertical axis A1 using powder-distribution blade 128, when rotating powder-supply arm 108 about vertical axis A1, to form an even layer of powder material 202 within powder-bed volume 204.

As expressed above, it can be appreciated that the relative surface area of powder-bed volume 204 is larger at locations farther from vertical axis A1 as compared to the surface area of powder-bed volume 204 at locations closer to vertical axis A1. As such, it is beneficial to move a portion of powder material 202 at locations closer to vertical axis A1 in a direction away from vertical axis A1 to locations farther from vertical axis A1. A portion of powder material 202 being moved in a direction extending away from vertical axis A1 provides a sufficient amount of powder material 202 to adequately and evenly cover powder-bed volume 204 when distributing powder material 202 using powder-distribution blade 128 during rotation of powder-supply arm 108.

During rotation of powder-supply arm 108, powder-distribution blade 128 engages an amount of powder material 20 that is freshly deposited from powder-deposition opening 126. Powder-distribution blade 128 distributes (e.g., pushes or moves) powder material 202 in a direction of movement that is perpendicular to blade central axis A4 during rotation of powder-supply arm 108. Orienting blade central axis A4 oblique to powder-supply-arm central axis A2 adjusts the direction of movement of powder material 202 so that a portion of powder material 202 moves in a direction away from vertical axis A1 (e.g., radially outward).

The relative angular orientation between blade central axis A4 and powder-supply-arm central axis A2 is any one of various oblique angles. In one or more examples, the oblique angle selected depends on various factors, such as the type of powder material 202 being used, the rotational speed of powder-supply arm 108, the configuration and geometry of powder-deposition opening 126, and the like. In one or more examples, the relative angular orientation between blade central axis A4 and powder-supply-arm central axis A2 is less than approximately ninety degrees. In one or more examples, the relative angular orientation between blade central axis A4 and powder-supply-arm central axis A2 is less than approximately forty-five degrees.

Figure 16:
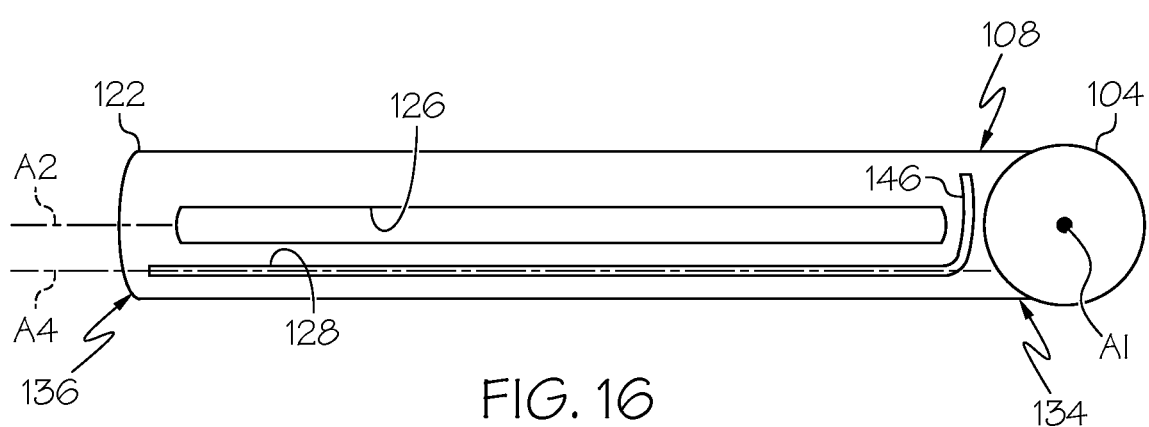
FIG. 16 is a schematic, bottom plan view of a sub-assembly of the additive-manufacturing apparatus of FIGS. 1A and 1B, according to one or more examples of the subject matter, disclosed herein.
Figure 17:
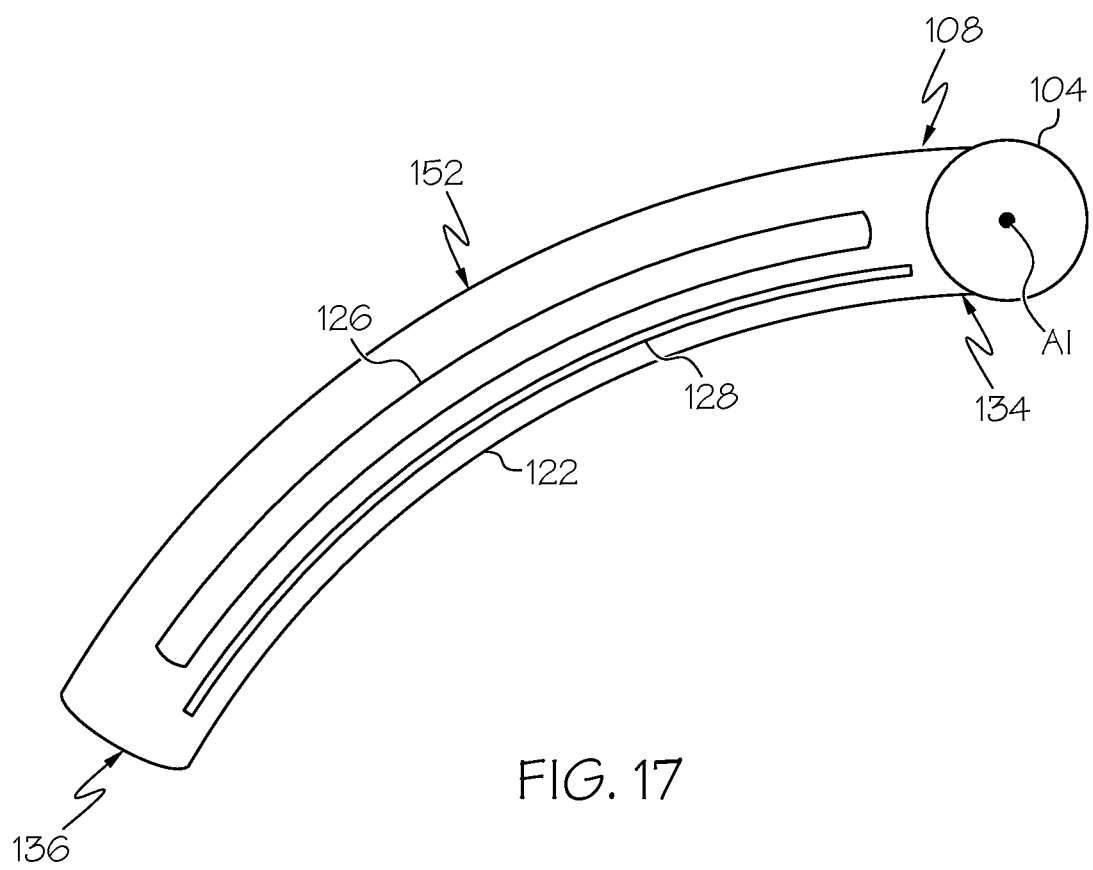
FIG. 17 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 16 for illustrative purposes only and not by way of limitation, powder-supply arm 108 has powder-supply-arm proximal end 134 and powder-supply-arm distal end 136, located opposite powder-supply-arm proximal end 134. Powder-supply arm 108 further comprises powder barrier 146, coupled to powder-distribution blade 128 proximate to powder-supply-arm proximal end 134 and extending between powder-deposition opening 126 and vertical axis A1. The preceding portion of this paragraph characterizes example 19 of the subject matter, disclosed herein, where example 19 also encompasses any one of examples 1 to 18, above.

Powder barrier 146 prevents powder material 202 from moving in a direction toward (e.g., radially inward relative to) vertical axis A1 during distribution of powder material 202 using powder-distribution blade 128 when rotating powder-supply arm 108 about vertical axis A1.

In one or more examples, powder barrier 146 is coupled to and extends downwardly from hollow body 122 of powder-supply arm 108. In one or more examples, powder barrier 146 is located adjacent to the proximal end of powder-deposition opening 126. In one or more examples, powder barrier 146 has a length that is greater than width W (FIGS. 11-14) of powder-deposition opening 126.

Referring generally to FIGS. 1A and 1B and particularly to, e.g., FIGS. 2-4, 27, and 28 for illustrative purposes only and not by way of limitation, powder-material source 106 comprises hopper 148. Powder-supply arm 108 further comprises powder-supply opening 132, formed in hollow body 122. Powder-supply opening 132 is in communication with interior volume 124 of hollow body 122. Hopper 148 is in communication with powder-supply opening 132 such that powder material 202 can be transferred from hopper 148 to interior volume 124 through powder-supply opening 132. The preceding portion of this paragraph characterizes example 20 of the subject matter, disclosed herein, where example 20 also encompasses any one of examples 1 to 19, above.

Hopper 148 facilitates discharge of powder material 202 to interior volume 124 of hollow body 122 of powder-supply arm 108 via powder-supply opening 132.

Hopper 148 is any suitable container that is configured to store a volume of powder material 202 and to transfer a portion of powder material 202 to interior volume 124 of hollow body 122 through powder-supply opening 132. In one or more examples, hopper 148 has a downward taper and is configured to discharge powder material 202 from a bottom.

Referring generally to FIGS. 1A and 1B and particularly to, e.g., FIGS. 2, 4, 27, and 28 for illustrative purposes only and not by way of limitation, hopper 148 is mounted on powder-supply arm 108. The preceding portion of this paragraph characterizes example 21 of the subject matter, disclosed herein, where example 21 also encompasses example 20, above.

Hopper 148 being mounted on powder-supply arm 108 facilitates discharge of powder material 202 directly into interior volume 124 of hollow body 122 of powder-supply arm 108 through powder-supply opening 132. Hopper 148 being mounted on powder-supply arm 108 also facilitates different configurations of powder-supply arm 108 and rotary drive 116 for rotation of powder-supply arm 108 about vertical axis A1.

In one or more examples, as illustrated in FIG. 2, powder-supply arm 108 is coupled to and is fixed relative to shaft 104 and hopper 148 is mounted on powder-supply arm 108. Shaft 104 is coupled to and is rotatable relative to support 102. Rotary drive 116 is configured to rotate shaft 104 about vertical axis A1 relative to support 102. Rotation of shaft 104 about vertical axis A1, in turn, rotates powder-supply arm 108 and hopper 148 about vertical axis A1 relative to support 102.

In one or more examples, as illustrated in FIG. 3, powder-supply arm 108 is coupled to and is rotatable relative to shaft 104 and hopper 148 is mounted on powder-supply arm 108. Shaft 104 is coupled to and is fixed relative to support 102. Rotary drive 116 is configured to rotate powder-supply arm 108 and hopper 148 about vertical axis A1 relative to shaft 104.

In one or more examples, hopper 148 is coupled to powder-supply arm 108 so that a discharge opening of hopper 148 is in communication with powder-supply opening 132 and powder material 202 is discharged directly into interior volume 124 of hollow body 122 through powder-supply opening 132.

Referring generally to FIGS. 1A and 1B and particularly to, e.g., FIG. 4 for illustrative purposes only and not by way of limitation, powder-material source 106 further comprises tubular chamber 150, coupled to powder-supply arm 108 and energy-supply arm 112. Hopper 148 is in communication with tubular chamber 150 such that powder material 202 can be transferred from hopper 148 to tubular chamber 150. Tubular chamber 150 is in communication with powder-supply opening 132 such that powder material 202 can be transferred from tubular chamber 150 to interior volume 124 of hollow body 122 through powder-supply opening 132. Rotary drive 116 is configured to rotate tubular chamber 150 about vertical axis A1 along with powder-supply arm 108 and energy-supply arm 112. The preceding portion of this paragraph characterizes example 22 of the subject matter, disclosed herein, where example 22 also encompasses example 20, above.

Tubular chamber 150 facilitates discharge of powder material 202 from hopper 148 into tubular chamber 150 and from tubular chamber 150 into interior volume 124 of hollow body 122 through powder-supply opening 132. Tubular chamber 150 being coupled to powder-supply arm 108 facilitates rotation of shaft 104 about vertical axis A1 relative to support 102 to rotate powder-supply arm 108 about vertical axis A1.

In one or more examples, powder-supply arm 108 and energy-supply arm 112 are coupled to and are fixed rotatable relative to shaft 104. Tubular chamber 150 is coupled to powder-supply arm 108 and energy-supply arm 112. In one or more examples, tubular chamber 150 is also coupled to shaft 104. Shaft 104 is coupled to and is rotatable relative to support 102. Rotary drive 116 is configured to rotate shaft 104 about vertical axis A1 relative to support 102. Rotation of shaft 104 about vertical axis A1, in turn, rotates powder-supply arm 108, energy-supply arm 112, and tubular chamber 150 about vertical axis A1 relative to support 102.

In one or more examples, powder-supply opening 132 is located inside of tubular chamber 150 so that an interior of tubular chamber 150 is in communication with powder-supply opening 132. Powder material 202 is discharged directly into interior volume 124 of hollow body 122 through powder-supply opening 132 from tubular chamber 150.

In one or more examples, tubular chamber 150 includes a seal, located at an interface between tubular chamber 150 and powder-supply arm 108 and energy-supply arm 112. This seal is configured to prevent powder material 202 from escaping from within tubular chamber 150.

In one or more examples, hopper 148 is located remotely from tubular chamber 150. Powder material 202 is discharged directly into the interior of tubular chamber 150 from hopper 148. In one or more examples, powder-material source 106 also includes a transfer mechanism, configured to convey power material 202 from hopper 148 to within tubular chamber 150. In one or more examples, powder-material source 106 includes a conduit or other suitable material-transfer tube that is connected to the discharge opening of hopper 148 and that is in communication with tubular chamber 150.

Figure 18:
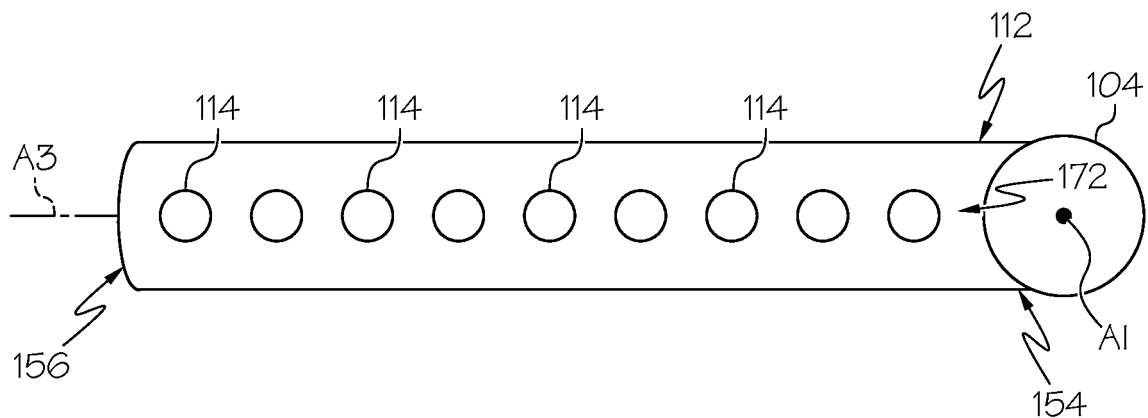
FIG. 18 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 18 for illustrative purposes only and not by way of limitation, energy-supply arm 112 has energy-supply-arm proximal end 154 and energy-supply-arm distal end 156, located opposite energy-supply-arm proximal end 154. A plurality of energy emitters 114 is positioned in linear array 172, extending along energy-supply-arm central axis A3 between energy-supply-arm proximal end 154 and energy-supply-arm distal end 156. The preceding portion of this paragraph characterizes example 23 of the subject matter, disclosed herein, where example 23 also encompasses any one of examples 1 to 22, above.

Linear array 172 of energy emitters 114 extending along energy-supply-arm central axis A3, for example, from energy-supply-arm proximal end 154 to energy-supply-arm distal end 156, increases an area of powder material 202 that can be consolidated per rotation of energy-supply arm 112 about vertical axis A1 and, thereby, improves efficiency of additive-manufacturing apparatus 100.

In one or more examples, energy emitters 114 of linear array 172 are suitably located (e.g., spaced) relative to each other so that focal spots 226 of energy beams 228 (FIGS. 28 and 30) emitted by a directly adjacent pair of energy emitters 114 of linear array 172 come into contact with or at least partially overlap approximately the same location on powder-bed volume 204 during rotation of energy-supply arm 112 about vertical axis A1. Focal spots 226 of energy beams 228 emitted by the directly adjacent pair of energy emitters 114 being in contact or at least partially overlapping provides a continuous or overlapping scan field so that a continuous portion of powder material 202 is consolidated using at least a portion of energy emitters 114 of linear array 172 when energy-supply arm 112 is rotated about vertical axis A1.

Figure 19:
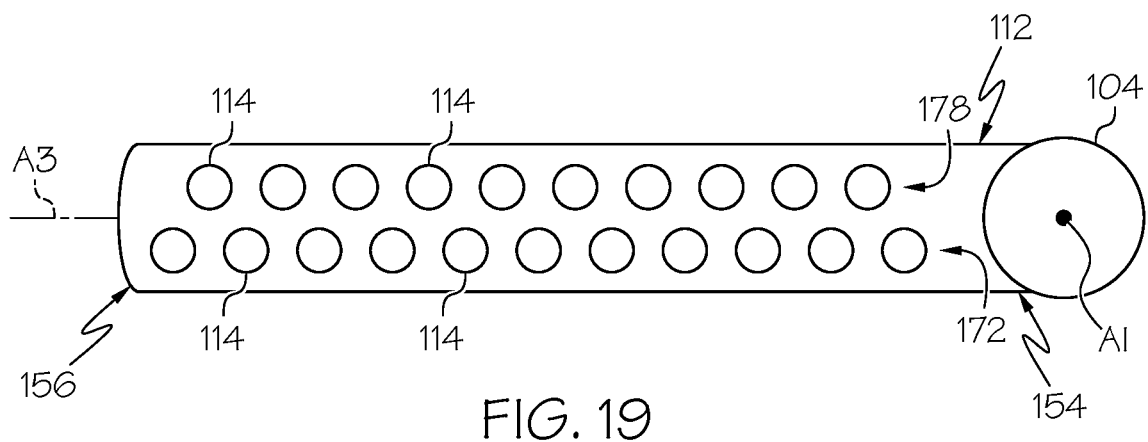
FIG. 19 is a schematic, bottom plan view of a sub-assembly of the additive-manufacturing apparatus of FIGS. 1A and 1B, according to one or more examples of the subject matter, disclosed herein.
Figure 20:
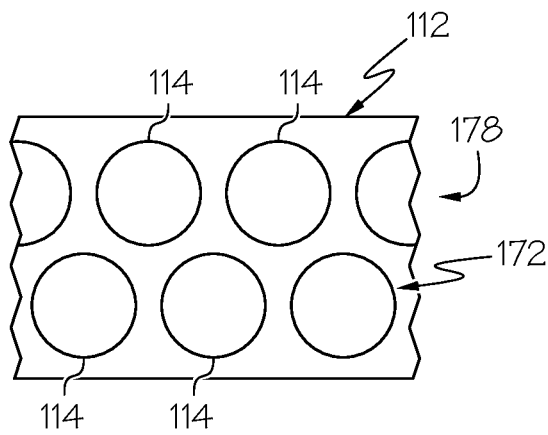
FIG. 20 is a schematic, bottom plan view of a portion of an energy-supply arm of the additive-manufacturing apparatus of FIGS. 1A and 1B, according to one or more examples of the subject matter, disclosed herein.
Figure 21:
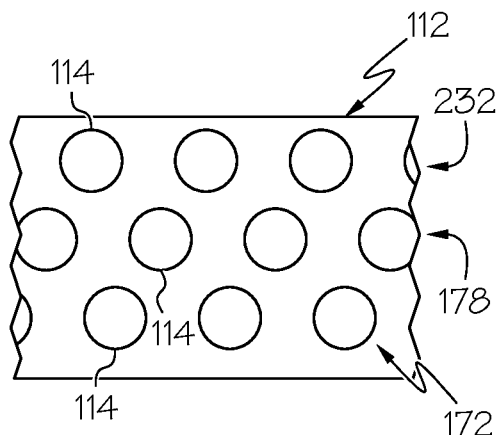
FIG. 21 is a schematic, bottom plan view of a portion of the energy-supply arm of the additive-manufacturing apparatus of FIGS. 1A and 1B, according to one or more examples of the subject matter, disclosed herein.

Referring generally to FIGS. 1A and 1B and particularly to, e.g., FIGS. 19-21 for illustrative purposes only and not by way of limitation, a second plurality of energy emitters 114 is arranged in second linear array 178 that extends along energy-supply-arm central axis A3 between energy-supply-arm proximal end 154 and energy-supply-arm distal end 156. Second linear array 178 of energy emitters 114 is offset along energy-supply-arm central axis A3 relative to linear array 172 of energy emitters 114. The preceding portion of this paragraph characterizes example 24 of the subject matter, disclosed herein, where example 24 also encompasses example 23, above.

Second linear array 178 of energy emitters 114 extending along energy-supply-arm central axis A3, for example, from energy-supply-arm proximal end 154 to energy-supply-arm distal end 156, further increases an area of powder material 202 that can be consolidated per rotation of energy-supply arm 112 about vertical axis A1 and, thereby, improves efficiency of additive-manufacturing apparatus 100. Second linear array 178 of energy emitters 114 being offset along energy-supply-arm central axis A3 relative to linear array 172 of energy emitters 114 also facilitates a continuous portion of powder material 202 being consolidated using at least a portion of energy emitters 114 of linear array 172 and second linear array 178 when energy-supply arm 112 is rotated about vertical axis A1.

In one or more examples, energy emitters 114 of linear array 172 and second linear array 178 are suitably located (e.g., spaced) relative to each other so that focal spots 226 of energy beams 228 (FIGS. 28 and 30) emitted by at least one of energy emitters 114 of linear array 172 and at least one of energy emitters 114 of second linear array 178 come into contact with or at least partially overlap approximately the same location on powder-bed volume 204 during rotation of energy-supply arm 112 about vertical axis A1. Focal spots 226 of energy beams 228 emitted by corresponding ones of energy emitters 114 of linear array 172 and second linear array 178 being in contact or at least partially overlapping provides a continuous or overlapping scan field so that a continuous portion of powder material 202 is consolidated using at least a portion of energy emitters 114 of linear array 172 and second linear array 178 when energy-supply arm 112 is rotated about vertical axis A1.

Referring generally to FIGS. 1A and 1B and particularly to, e.g., FIG. 21 for illustrative purposes only and not by way of limitation, a third plurality of energy emitters 114 is arranged in third linear array 232 that extends along energy-supply-arm central axis A3 between energy-supply-arm proximal end 154 and energy-supply-arm distal end 156. Third linear array 232 of energy emitters 114 is offset along energy-supply-arm central axis A3 relative to at least one of linear array 172 of energy emitters 114 and second linear array 178 of energy emitters 114. The preceding portion of this paragraph characterizes example 25 of the subject matter, disclosed herein, whereby example 25 also encompasses example 24, above.

Third linear array 232 of energy emitters 114 extending along energy-supply-arm central axis A3, for example, from energy-supply-arm proximal end 154 to energy-supply-arm distal end 156, further increases an area of powder material 202 that can be consolidated per rotation of energy-supply arm 112 about vertical axis A1 and, thereby, improves efficiency of additive-manufacturing apparatus 100. Third linear array 232 of energy emitters 114 being offset along energy-supply-arm central axis A3 relative to at least one of linear array 172 of energy emitters 114 and second linear array 178 of energy emitters 114 also facilitates a continuous portion of powder material 202 being consolidated using at least a portion of energy emitters 114 of linear array 172 and second linear array 178 when energy-supply arm 112 is rotated about vertical axis A1.

In one or more examples, energy emitters 114 of third linear series 232 are suitably located (e.g., spaced) relative to energy emitters 114 of at least one of linear array 172 and second linear array 178 so that focal spots 226 of energy beams 228 (FIGS. 28 and 30) emitted by at least one of energy emitters 114 of third linear series 232 and at least one of energy emitters 114 of at least one of linear array 172 and second linear array 178 come into contact with or at least partially overlap approximately the same location on powder-bed volume 204 during rotation of energy-supply arm 112 about vertical axis A1. Focal spots 226 of energy beams 228 emitted by corresponding ones of energy emitters 114 of third linear series 232 and at least one of linear array 172 and second linear array 178 being in contact or at least partially overlapping provides a continuous or overlapping scan field so that a continuous portion of powder material 202 is consolidated using at least a portion of energy emitters 114 of third linear series 232 and at least one of linear array 172 and second linear array 178 when energy-supply arm 112 is rotated about vertical axis A1.

In one or more examples, third linear array 232 of energy emitters 114 is offset along energy-supply-arm central axis A3 relative to both of linear array 172 of energy emitters 114 and second linear array 178 of energy emitters 114. In such examples, energy emitters 114 of third linear series 232 are suitably located (e.g., spaced) relative to energy emitters 114 of linear array 172 and second linear array 178 so that focal spots 226 of energy beams 228 emitted by at least one of energy emitters 114 of third linear series 232, at least one of energy emitters 114 of linear array 172, and at least one of energy emitters 114 of second linear array 178 come into contact with or at least partially overlap approximately the same location on powder-bed volume 204 during rotation of energy-supply arm 112 about vertical axis A1.

Figure 22:
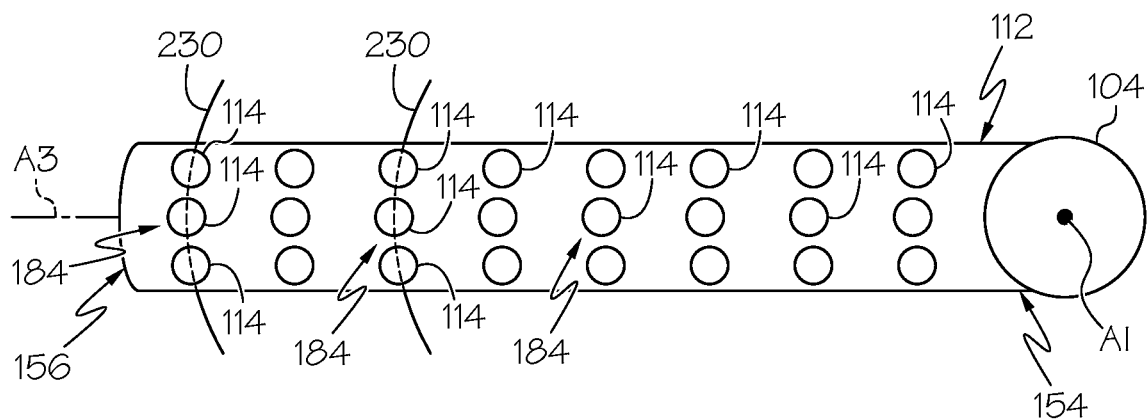
FIG. 22 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 22 for illustrative purposes only and not by way of limitation, energy emitters 114 are arranged in sets 184, each containing plurality of energy emitters 114. Sets 184 are arranged along circular paths 230, circumscribing vertical axis A1 and centered on vertical axis A1. The preceding portion of this paragraph characterizes example 26 of the subject matter, disclosed herein, whereby example 26 also encompasses any one of examples 1 to 25, above.

Arrangement of energy emitters 114 in sets 184 along corresponding ones of circular paths 230 provides for focal spot 226 of energy beam 228 (FIGS. 29 and 30) emitted by each one of energy emitters 114 of a corresponding one of sets 184 to at least partially overlap at given location on powder-bed volume 204 (FIGS. 29 and 30) disposed along a corresponding one of circular paths 230 when rotating energy-supply arm 112 about vertical axis A1.

Figure 29:
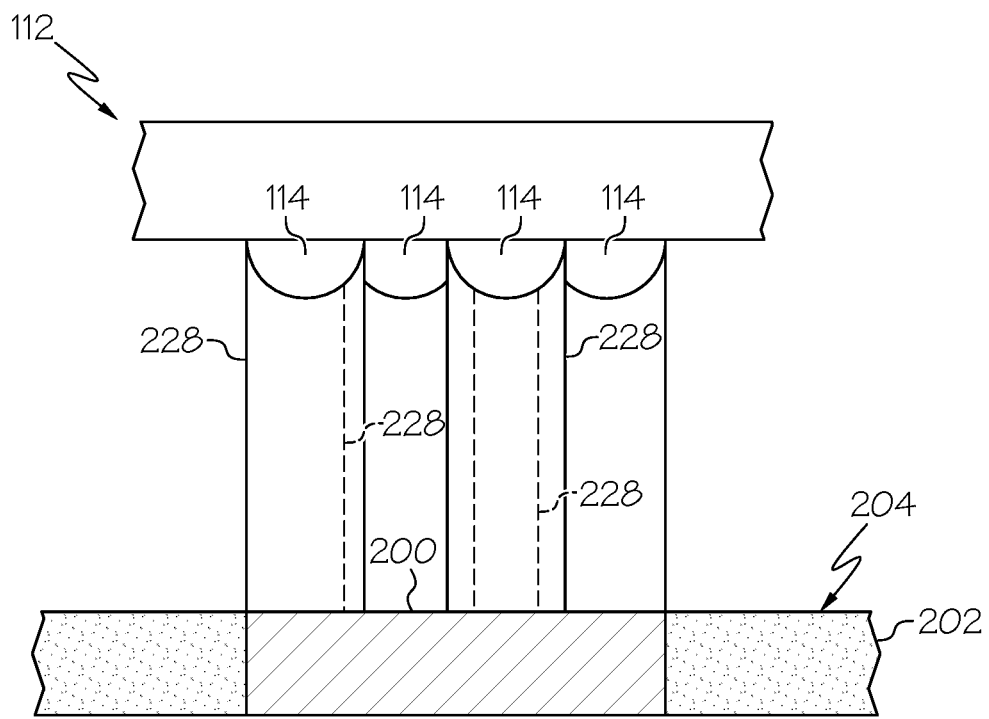
FIG. 29 is a schematic, elevational view of a portion of the energy-supply arm of the additive-manufacturing apparatus of FIGS. 1A and 1B, during consolidation of a powder material, according to one or more examples of the subject matter, disclosed herein.
Figure 30:
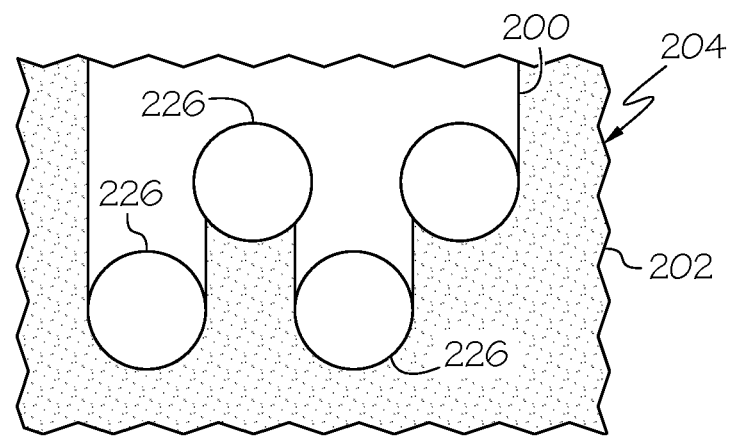
FIG. 30 is a schematic, top plan, environmental view of a portion of a powder material being consolidated to form a portion of an object using the additive-manufacturing apparatus of FIGS. 1A and 1B, according to one or more examples of the subject matter, disclosed herein.

In one or more examples, while rotating energy-supply arm 112 about vertical axis A1 during consolidation of a portion of powder material 202, each one of energy emitters 114 of a corresponding one of sets 184 sequentially passes over approximately the same location on powder-bed volume 204 (FIGS. 29 and 30). As such, focal spots 226 of energy beams 228 emitted by each one of energy emitters 114 of the corresponding one of sets 184 sequentially heats approximately the same portion of powder material 202 to at least partially consolidate powder material 202. Accordingly, a single rotation of energy-supply arm 112 is capable of heating the same portion of powder material 202 in powder-bed volume 204 for a longer period or multiple times, which improves efficiency of additive-manufacturing apparatus 100.

In one or more examples, one of energy emitters 114 of each one of sets 184 is one of energy emitters 114 of linear array 172 (FIG. 21), one of energy emitters 114 of each one of sets 184 is one of energy emitters 114 of second linear array 178 (FIG. 21), and one of energy emitters 114 of each one of sets 184 is one of energy emitters 114 of third linear series 232 (FIG. 21).

Figure 23:
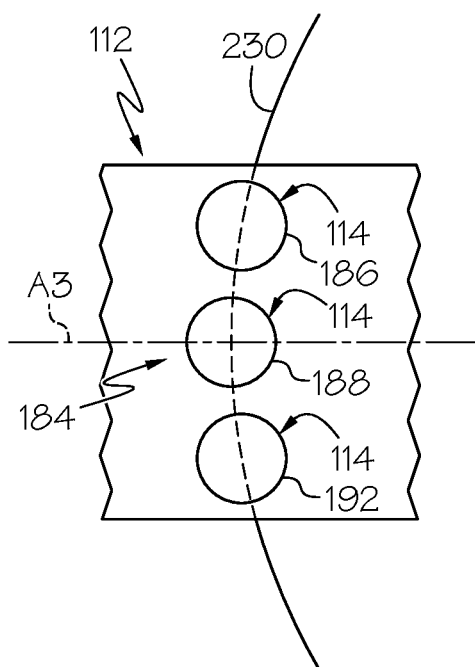
FIG. 23 is a schematic, bottom plan view of a portion of the energy-supply arm of the additive-manufacturing apparatus of FIGS. 1A and 1B, according to one or more examples of the subject matter, disclosed herein.

Referring generally to FIGS. 1A and 1B and particularly to, e.g., FIG. 23 for illustrative purposes only and not by way of limitation, each of sets 184 of energy emitters 114 is arranged along a corresponding one of circular paths 230. Each of sets 184 of energy emitters 114 comprises pre-heat emitter 186, configured to heat a portion of powder material 202 to a first temperature. Each of sets 184 of energy emitters 114 also comprises melt emitter 188, configured to heat a portion of powder material 202 to a second temperature that is higher than the first temperature. The preceding portion of this paragraph characterizes example 27 of the subject matter, disclosed herein, where example 27 also encompasses example 26, above.

Pre-heat emitter 186 and melt emitter 188 of each one of sets 184 being arranged along a corresponding one of circular paths 230 enables pre-heat emitter 186 to pre-heat a portion of powder material 202 and melt emitter 188 to subsequently melt the portion of powder material 202 at a corresponding location on powder-bed volume 204 during rotation of energy-supply arm 112 about vertical axis A1, which increases efficiency and quality of the consolidation operation and improves material properties of object 200.

In one or more examples, pre-heating a portion of powder material 202 to the first temperature using pre-heat emitter 186 is achieved by at least one of heating the portion of powder material 202 for a predetermined period (e.g., dependent upon the rotational speed of energy-supply arm 112) and heating the portion of powder material 202 at a predetermined energy level. The first temperature depends on various factors, such as the type of powder material 202, the thermal profile of the consolidation operation, and the like.

In one or more examples, heating a portion of powder material 202 to the second temperature using melt emitter 188 is achieved by at least one of heating the portion of powder material 202 for a predetermined period (e.g., dependent upon the rotational speed of energy-supply arm 112) and heating the portion of powder material 202 at a predetermined energy level. The second temperature depends on various factors, such as the type of powder material 202, the thermal profile of the consolidation operation, and the like. Generally, the second temperature is a consolidation temperature (e.g., a melting temperature of sintering temperature) of powder material 202.

In one or more examples, pre-heat emitter 186 and melt emitter 188, in combination, are configured to gradually increase the temperature of the portion of powder material 202 being consolidated to the consolidation temperature as compared to a consolidation operation where powder material is rapidly heated to the consolidation temperature only by a melt emitter.

In one or more examples, pre-heat emitter 186 of each one of sets 184 is one of energy emitters 114 of linear array 172 (FIG. 20) and melt emitter 188 of each one of sets 184 is one of energy emitters 114 of second linear array 178 (FIG. 20).

Referring generally to FIGS. 1A and 1B and particularly to, e.g., FIG. 23 for illustrative purposes only and not by way of limitation, each of sets 184 of energy emitters 114 further comprises post-heat emitter 192, configured to heat a portion of powder material 202 to a third temperature that is lower than the second temperature. Melt emitter 188 is located between pre-heat emitter 186 and post-heat emitter 192. The preceding portion of this paragraph characterizes example 28 of the subject matter, disclosed herein, where example 28 also encompasses example 27, above.

Post-heat emitter 192 of each one of sets 184 being arranged along a corresponding one of circular paths 230 enables post-heat emitter 192 to subsequently control cooling of the portion of powder material 202 after melting the portion of powder material at a corresponding location on powder-bed volume 204 during rotation of energy-supply arm 112 about vertical axis A1, which increases quality of the consolidation operation and improves material properties of object 200.

In one or more examples, post-heating a portion of powder material 202 to the third temperature using post-heat emitter 192 is achieved by at least one of heating the portion of powder material 202 for a predetermined period (e.g., dependent upon the rotational speed of energy-supply arm 112) and heating the portion of powder material 202 at a predetermined energy level. The third temperature depends on various factors, such as the type of powder material 202, the thermal profile of the consolidation operation, and the like.

In one or more examples, post-heat emitter 192 is configured to gradually decrease the temperature of the portion of powder material 202 being consolidated as compared to a consolidation operation where powder material is rapidly cooled.

In one or more examples, post-heat emitter 192 of each one of sets 184 is one of energy emitters 114 of third linear series 232 (FIG. 21).

Referring generally to FIGS. 1A and 1B and particularly to, e.g., FIGS. 4-6 and 11-13 for illustrative purposes only and not by way of limitation, powder-supply arm 108 is curved in a viewing plane, perpendicular to vertical axis A1. The preceding portion of this paragraph characterizes example 29 of the subject matter, disclosed herein, where example 29 also encompasses any one of examples 1 to 8 and 14 to 28, above.

Powder-supply arm 108 being curved facilitates powder-distribution blade 128 that is also curved.

In one or more examples, powder-distribution blade 128 is coupled to hollow body 122 of powder-supply arm 108 and is curved in the viewing plane, perpendicular to vertical axis A1, corresponding to the curved profile of powder-supply arm 108. Thus, in one or more examples, powder-supply-arm central axis A2 and blade central axis A4 are curved. Powder-supply arm 108 and, thus, powder-distribution blade 128 being curved facilitate movement of powder material 202 in a direction away from (e.g., radially outward relative to) vertical axis A1, when rotating powder-supply arm 108 about vertical axis A1, to form an even layer of powder material 202 within powder-bed volume 204.

As expressed above, it can be appreciated that the relative surface area of powder-bed volume 204 is larger at locations farther from vertical axis A1 as compared to the surface area of powder-bed volume 204 at locations closer to vertical axis A1. As such, it is beneficial to move a portion of powder material 202 at locations closer to vertical axis A1 in a direction away from vertical axis A1 to locations farther from vertical axis A1. A portion of powder material 202, being moved in a direction extending away from vertical axis A1, provides a sufficient amount of powder material 202 to adequately and evenly cover powder-bed volume 204 when distributing powder material 202 using powder-distribution blade 128 during rotation of powder-supply arm 108.

During rotation of powder-supply arm 108, powder-distribution blade 128 engages an amount of powder material 20 that is freshly deposited from powder-deposition opening 126. With powder-distribution blade 128 being curved, powder-distribution blade 128 distributes (e.g., pushes or moves) powder material 202 in a direction of movement that is perpendicular to a tangent line at a given point along blade central axis A4 during rotation of powder-supply arm 108. Providing powder-distribution blade 128 that is curved adjusts the direction of movement of powder material 202 so that a portion of powder material 202 moves in a direction away from vertical axis A1 (e.g., radially outward).

In one or more examples, conveyor screw 140 is flexible to accommodate the curvature of hollow body 122 of powder-supply arm 108.

Referring generally to FIGS. 1A and 1B and particularly to, e.g., FIGS. 2-4, 27, and 28 for illustrative purposes only and not by way of limitation, additive-manufacturing apparatus 100 further comprises first energy-transmission line 166, configured to be in one of electrical or optical communication with energy source 110, rotary energy connector 170, configured to be in one of electrical or optical communication with first energy-transmission line 166, and second energy-transmission line 168, configured to be in one of electrical or optical communication with rotary energy connector 170. The preceding portion of this paragraph characterizes example 30 of the subject matter, disclosed herein, where example 30 also encompasses any one of examples 1 to 29, above.

Rotary energy connector 170 enables second energy-transmission line 168 to rotate relative to first energy-transmission line 166 during rotating energy-supply arm 112 about vertical axis A1.

In one or more examples, as illustrated in FIGS. 2, 4, 27, and 28, second energy-transmission line 168 extends through shaft 104 and through at least a portion of energy-supply arm 112 for connection to energy emitters 114. Rotary energy connector 170 is configured to enable second energy-transmission line 168 to rotate relative to first energy-transmission line 166 during rotation of to shaft 104 and energy-supply arm 112 about vertical axis A1 relative to support 102.

In one or more examples, each one of first energy-transmission line 166 and second energy-transmission line 168 includes at least one electrical-transmission line (e.g., electrical cable or wire) configured to transfer electrical power (e.g., electricity) from energy source 110 to energy emitters 114. In these examples, rotary energy connector 170 includes, or takes the form of, a rotary electrical connector.

In one or more examples, each one of first energy-transmission line 166 and second energy-transmission line 168 includes at least one optical-transmission line (e.g., optical fiber) configured to transfer optical energy (e.g., laser light) from energy source 110 to energy emitters 114. In these examples, rotary energy connector 170 includes, or takes the form of, a rotary optical connector.

Referring generally to FIGS. 1A and 1B for illustrative purposes only and not by way of limitation, each of energy emitters 114 comprises laser emitting diode 160, configured to be in electrical communication with second energy-transmission line 168 and with energy source 110. The preceding portion of this paragraph characterizes example 31 of the subject matter, disclosed herein, where example 31 also encompasses example 30, above.

Energy emitters 114 being laser emitting diode 160 enables simple, independent control of each one of energy emitters 114.

In one or more examples, laser emitting diode 160 is electrically coupled to energy source 110 via second energy-transmission line 168, rotary energy connector 170, and first energy-transmission line 166. In one or more examples, laser emitting diode 160 is selectively actuated and a peak power or energy level of laser emitting diode 160 is selectively controlled, for example, using controller 238.

Referring generally to FIGS. 1A and 1B for illustrative purposes only and not by way of limitation, each of energy emitters 114 comprises optical output 162, configured to be in optical communication with second energy-transmission line 168 and with energy source 110. The preceding portion of this paragraph characterizes example 32 of the subject matter, disclosed herein, where example 32 also encompasses example 30, above.

Each one of energy emitters 114 being optical output 162, in communication with second energy-transmission line 168 enables a greater number of energy emitters 114 to be located on energy-supply arm 112 as compared to each one of energy emitters 114 being laser emitting diode 160.

In one or more examples, optical output 162 of second energy-transmission line 168 is optically coupled to energy source 110 via rotary energy connector 170 and first energy-transmission line 166. In one or more examples, optical output 162 of second energy-transmission line 168 is selectively actuated and a peak power or energy level of optical output 162 of second energy-transmission line 168 is selectively controlled, for example, using controller 238.

Referring generally to FIGS. 1A and 1B and particularly to, e.g., FIGS. 27 and 28 for illustrative purposes only and not by way of limitation, additive-manufacturing apparatus 100 further comprises build platform 206 and trough 208, surrounding build platform 206. The preceding portion of this paragraph characterizes example 33 of the subject matter, disclosed herein, where example 33 also encompasses any one of examples 1 to 32, above.

Build platform 206 provides, or serves as, a build surface that supports powder-bed volume 204 and object 200 that is additively manufactured from powder material 202. Trough 208 collects an excess amount of powder material 202 that is moved beyond a perimeter boundary of build platform 206 and powder-bed volume 204 by powder-distribution blade 128 during rotation of powder-supply arm 108.

In one or more examples, additive-manufacturing apparatus 100 includes a powder-containment compartment that is configured to contain powder material 202 that forms powder-bed volume 204. Build platform 206 is located within the powder-containment compartment and at least partially delimits powder-bed volume 204. Powder material 202 is contained by the powder-containment compartment when deposited upon build platform 206.

Build platform 206 has any one of various two-dimensional shapes, viewed along vertical axis A1. In one or more examples, build platform 206 has a circular shape. Accordingly, in one or more examples, powder-bed volume 204 has a circular shape, viewed along vertical axis A1.

In one or more examples, the powder-containment compartment includes a sidewall that extends from a base of the powder-containment compartment. In one or more examples, trough 208 forms an upper portion of the sidewall of the powder-containment compartment. Trough 208 is located proximate to (e.g., at or near) a perimeter edge of build platform 206 or a perimeter boundary of powder-bed volume 204 so that an excess amount of powder material 202 that is moved in a direction extending away from vertical axis A1 and off build platform 206 is collected within trough 208.

Referring generally to FIGS. 1A and 1B and particularly to, e.g., FIGS. 27 and 28 for illustrative purposes only and not by way of limitation, build platform 206 is movable along vertical axis A1 relative to powder-supply arm 108 and energy-supply arm 112. The preceding portion of this paragraph characterizes example 34 of the subject matter, disclosed herein, where example 34 also encompasses example 33, above.

Vertical movement of build platform 206 relative to powder-supply arm 108 and energy-supply arm 112 facilitates successive layering of powder material 202 upon build platform 206.

In one or more examples, vertical axis A1 passes through the center of build platform 206. In one or more examples, build platform 206 continuously moves away from powder-supply arm 108 and energy-supply arm 112 during continuous rotation of powder-supply arm 108 and energy-supply arm 112 about vertical axis A1. The speed of linear movement of build platform 206 corresponds to the rotational speed of powder-supply arm 108 and energy-supply arm 112 so that build platform 206 is appropriately located for deposition and distribution of each subsequent layer of powder material 202.

In one or more examples, additive-manufacturing apparatus 100 includes a linear drive that is configured to vertically move build platform 206 relative to relative to powder-supply arm 108 and energy-supply arm 112. In one or more examples, the linear drive is connected to build platform 206. For example, the linear drive may be connected to the center of an underside surface of build platform 206. In one or more examples, the linear drive includes, or takes the form of, any suitable linear drive mechanism or linear actuator that is configured to drive linear (e.g., vertical) motion of build platform 206 relative to powder-supply arm 108 and energy-supply arm 112, such as a worm gear, a hydraulic actuator, a pneumatic actuator, and the like.

Referring generally to FIGS. 1A and 1B and particularly to, e.g., FIGS. 26-27 for illustrative purposes only and not by way of limitation, build platform 206 is movable along vertical axis A1 relative to trough 208. The preceding portion of this paragraph characterizes example 35 of the subject matter, disclosed herein, where example 35 also encompasses example 33 or 34, above.

Vertically moving build platform 206 relative to trough 208 maintains trough 208 in an appropriate position for collecting an excess amount of powder material 202 that is moved off build platform 206 or beyond a perimeter boundary of powder-bed volume 204 during rotation of powder-supply arm 108 about vertical axis A1.

Trough 208 includes, or takes the form of, any suitable elongated, open container that extends around an entire perimeter of build platform 206 and powder-bed volume 204. In one or more examples, a location of trough 208 along vertical axis A1 is fixed relative to powder-supply arm 108 and energy-supply arm 112.

During rotation of powder-supply arm 108, powder-distribution blade 128 distributes powder material 202 in powder-bed volume 204 to form a layer of powder material 202. In one or more examples, powder-distribution blade 128 moves powder material 202 in a direction away from vertical axis A1. In such examples, an excess amount of powder material 202 is pushed off build platform 206 or is moved beyond a perimeter boundary of powder-bed volume 204 and is collected within trough 208.

Referring generally to FIGS. 1A and 1B and particularly to, e.g., FIGS. 27 and 28 for illustrative purposes only and not by way of limitation, additive-manufacturing apparatus 100 further comprising powder-recycling device 210 that is in communication with trough 208 and powder-material source 106, such that powder material 202 can be transferred from trough 208 to powder-material source 106. The preceding portion of this paragraph characterizes example 36 of the subject matter, disclosed herein, where example 36 also encompasses example 33, above.

Powder-recycling device 210 enables reuse of powder material 202 in the additive manufacturing operation.

In one or more examples, powder-recycling device 210 is coupled to an outlet of trough 208. A portion of powder material 202 that is moved beyond the perimeter boundary of build platform 206 or powder-bed volume 204 and that is collected in trough 208 is transferred back to powder-material source 106 using powder-recycling device 210. In one or more examples, powder-recycling device 210 is configured to clean and/or condition of powder material 202 collected by trough 208 for reuse in the additive manufacturing process.

In one or more examples, powder-recycling device 210 includes a powder-transfer mechanism that is in communication with an interior of trough 208 and that is configured to convey or otherwise transfer powder material 202 back to powder-material source 106.

Figure 24:
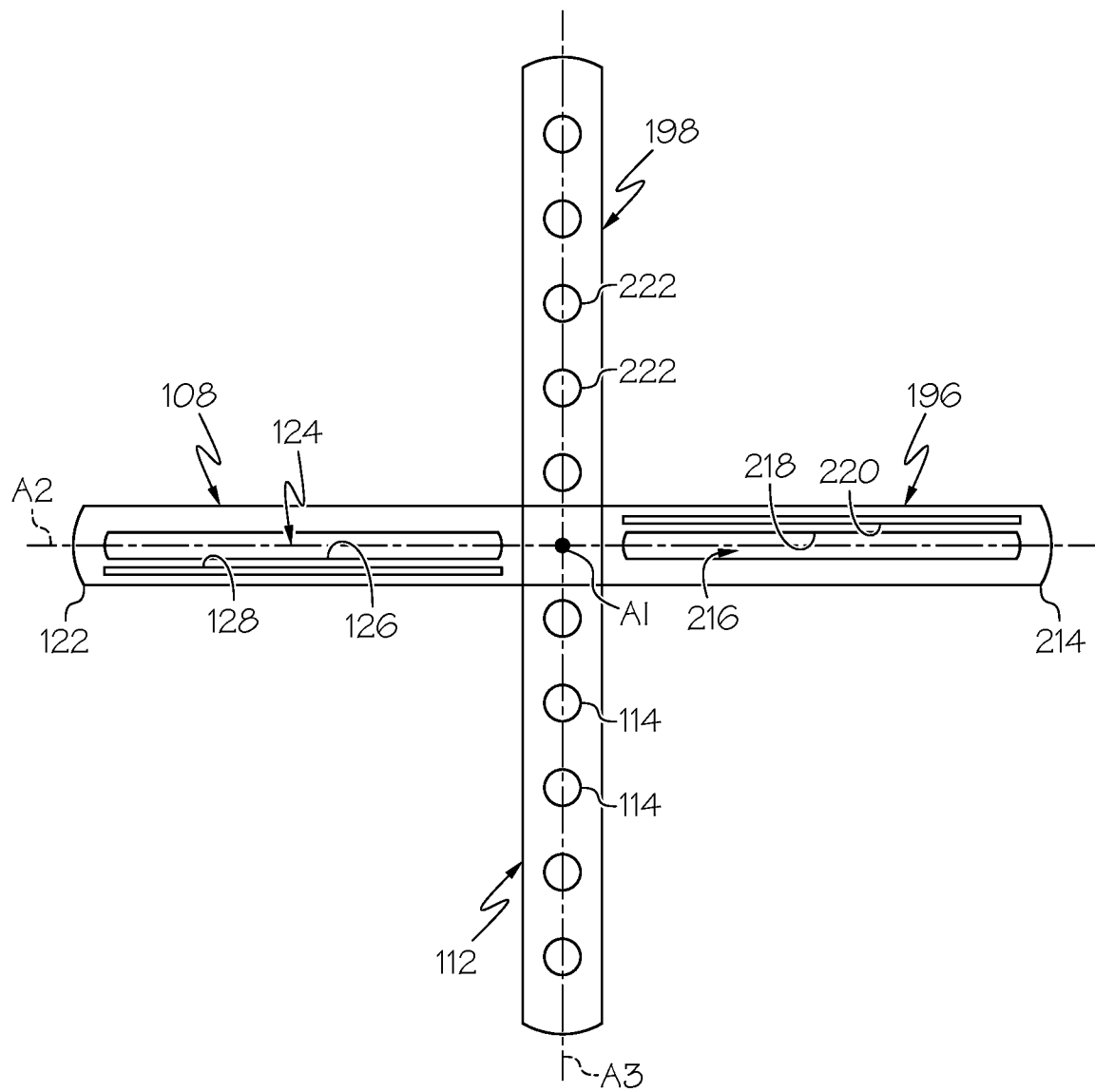
FIG. 24 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 24 for illustrative purposes only and not by way of limitation, additive-manufacturing apparatus 100 further comprises second powder-supply arm 196, which comprises second hollow body 214, having second interior volume 216 that is in communication with a second powder-material source 236, such that powder material 202 can be transferred from powder-material source 106 to second interior volume 216. Second powder-supply arm 196 also comprises second powder-deposition opening 218, formed in second hollow body 214. Second powder-deposition opening 218 is in communication with second interior volume 216 of second hollow body 214 such that powder material 202 can be transferred out of second interior volume 216 through second powder-deposition opening 218. Second powder-supply arm 196 further comprises second powder-distribution blade 220, coupled to second hollow body 214 and extending along second powder-deposition opening 218. Additive-manufacturing apparatus 100 also comprises second energy-supply arm 198. Additive-manufacturing apparatus 100 further comprises second energy emitters 222, coupled to second energy-supply arm 198. Second energy emitters 222 are in one of electrical or optical communication with energy source 110. Rotary drive 116 is further configured to rotate second powder-supply arm 196 and second energy-supply arm 198 about vertical axis A1. The preceding portion of this paragraph characterizes example 37 of the subject matter, disclosed herein, where example 37 also encompasses any one of examples 1 to 36, above.

Second powder-supply arm 196 and second energy-supply arm 198 enable two layers of powder material 202 to be deposited, distributed, and consolidated per one rotation of powder-supply arm 108, energy-supply arm 112, second powder-supply arm 196 and second energy-supply arm 198, thereby, improving efficiency of additive-manufacturing apparatus 100.

In one or more examples, second powder-material source 236 is substantially the same as powder-material source 106.

In one or more examples, second powder-supply arm 196 is substantially the same as powder-supply arm 108. For example, second hollow body 214 is substantially the same as hollow body 122, second interior volume 216 is substantially the same as interior volume 124, second powder-deposition opening 218 is substantially the same as powder-deposition opening 126, and second powder-distribution blade 220 is substantially the same as powder-distribution blade 128.

In one or more examples, second energy-supply arm 198 is substantially the same as energy-supply arm 112. In one or more examples, second energy emitters 222 are substantially the same as energy emitters 114.

In one or more examples, rotary drive 116 is configured to rotate powder-supply arm 108, energy-supply arm 112, second powder-supply arm 196, and second energy-supply arm 198 about vertical axis A1 at a constant speed. In one or more examples, second powder-supply arm 196, and second energy-supply arm 198 are coupled to shaft 104.

In one or more examples, second powder-supply arm 196 and second energy-supply arm 198 are fixed to shaft 104 so that second powder-supply arm 196 and second energy-supply arm 198 are not rotatable and are not translatable relative to shaft 104. Rotary drive 116 is configured to rotate shaft 104 about vertical axis A1 relative to support 102.

In one or more examples, rotary drive 116 is configured to rotate second powder-supply arm 196 and second energy-supply arm 198 about vertical axis A1 relative to shaft 104.

In one or more examples, additive-manufacturing apparatus 100 includes more than two powder-supply arms and/or more than two energy-supply arms. Generally, additive-manufacturing apparatus 100 includes at least one energy-supply arms associated with each powder-supply arm.

Figure 25:
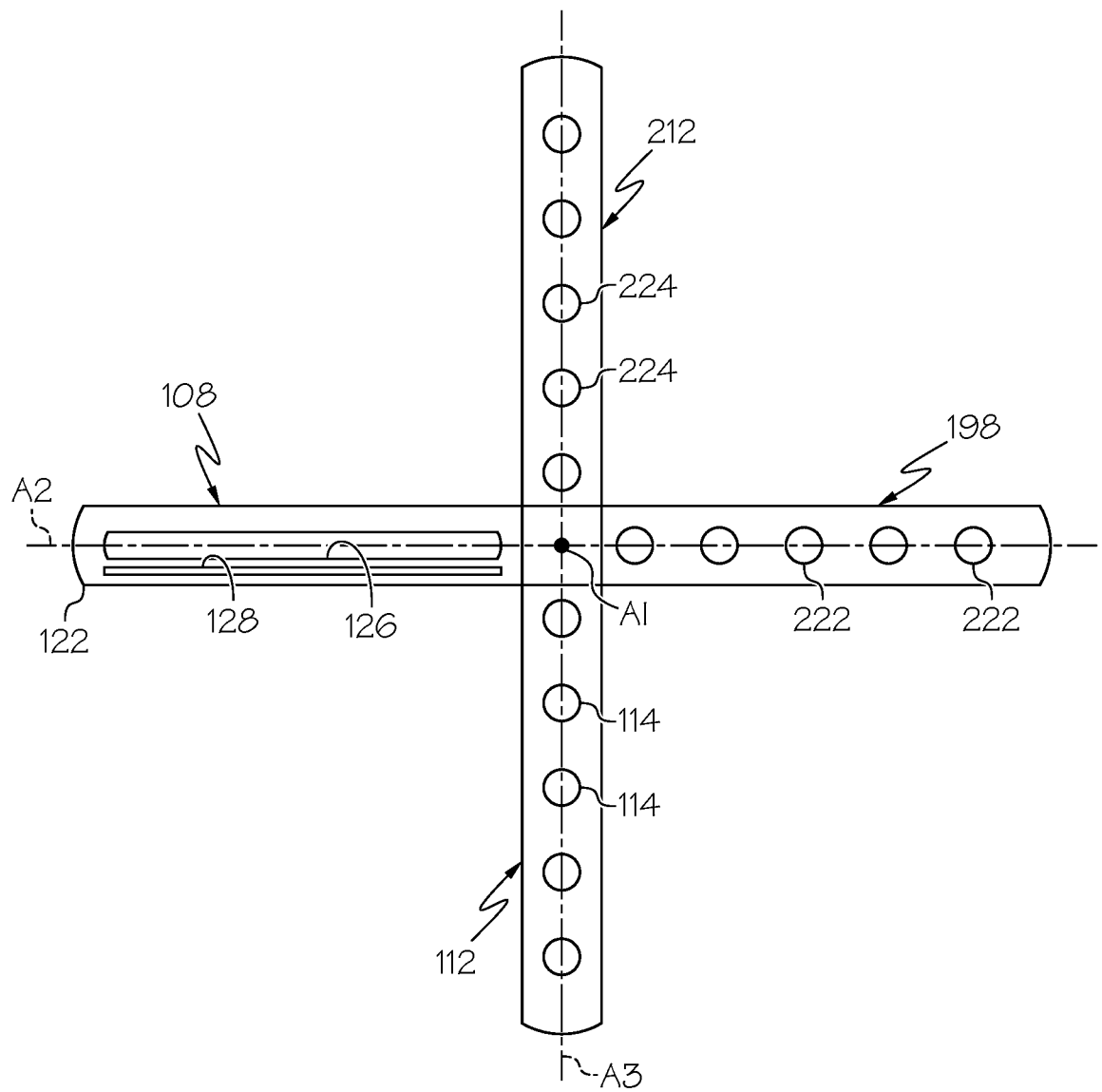
FIG. 25 is a schematic, bottom plan view of a sub-assembly of the additive-manufacturing apparatus of FIGS. 1A and 1B, according to one or more examples of the subject matter, disclosed herein.

Referring generally to FIGS. 1A and 1B and particularly to, e.g., FIG. 25 for illustrative purposes only and not by way of limitation, additive-manufacturing apparatus 100 further comprises second energy-supply arm 198. Additive-manufacturing apparatus 100 also comprises second energy emitters 222, coupled to second energy-supply arm 198. Second energy emitters 222 are in one of electrical or optical communication with energy source 110. Additive-manufacturing apparatus 100 further comprises third energy-supply arm 212 and third energy emitters 224, coupled to third energy-supply arm 212. Third energy emitters 224 are in one of electrical or optical communication with energy source 110. Rotary drive 116 is further configured to rotate second energy-supply arm 198 and third energy-supply arm 212 about vertical axis A1. The preceding portion of this paragraph characterizes example 38 of the subject matter, disclosed herein, where example 38 also encompasses any one of examples 1 to 36, above.

Second energy-supply arm 198 and third energy-supply arm 212 enable a substantially continuous portion of powder material 202 or a plurality of portions of powder material 202 of the same layer of powder material 202 to be consolidated to form a portion of object 200 or a portion of a plurality of objects 200 per one rotation of energy-supply arm 112, second energy-supply arm 198, and third energy-supply arm 212, thereby, improving efficiency of additive-manufacturing apparatus 100.

In one or more examples, second energy-supply arm 198 and third energy-supply arm 212 are substantially the same as energy-supply arm 112. In one or more examples, second energy emitters 222 and third energy emitters 224 are substantially the same as energy emitters 114.

In one or more examples, second energy-supply arm 198 and third energy-supply arm 212 are fixed to shaft 104 so that second energy-supply arm 198 and third energy-supply arm 212 are not rotatable and are not translatable relative to shaft 104. Rotary drive 116 is configured to rotate shaft 104 about vertical axis A1 relative to support 102.

In one or more examples, rotary drive 116 is configured to rotate second energy-supply arm 198 and third energy-supply arm 212 about vertical axis A1 relative to shaft 104.

Referring generally to FIG. 35 and particularly to, e.g., FIGS. 1A, 1B, and 2-33 for illustrative purposes only and not by way of limitation, method 1000 of additively manufacturing object 200 from powder material 202 is disclosed. Method 1000 comprises, (block 1012) discharging powder material 202 from powder-deposition opening 126 in hollow body 122 of powder-supply arm 108, while rotating powder-supply arm 108 and energy-supply arm 112 about vertical axis A1. Method 1000 also comprises, (block 1022) while rotating powder-supply arm 108 and energy-supply arm 112 about vertical axis A1, distributing powder material 202 within powder-bed volume 204 using powder-distribution blade 128 that is coupled to hollow body 122 and extends along powder-deposition opening 126. Method 1000 further comprises, (block 1032) while rotating powder-supply arm 108 and energy-supply arm 112 about vertical axis A1, consolidating at least a portion of powder material 202 in powder-bed volume 204 using energy emitters 114, coupled to energy-supply arm 112. The preceding portion of this paragraph characterizes example 39 of the subject matter, disclosed herein.

Method 1000 enables substantially continuous (e.g., uninterrupted) depositing, distributing, and consolidating at least a portion of powder material 202 when rotating powder-supply arm 108 and energy-supply arm 112 about vertical axis A1, which improves processing speeds for an additive manufacturing operation by eliminating changes in direction (e.g., a need for back and forth motion) and, thus, corresponding acceleration and deceleration of the operative components of additive-manufacturing apparatus 100 during depositing, distributing, and consolidating powder material 202.

Method 1000 beneficially facilitates reducing time and energy associated with additively manufacturing object 200 from powder material 202, which, in turn, facilitates increasing the overall efficiency of method 1000. Method 1000 beneficially facilitates automated depositing, distributing, and consolidating powder material 202 to form object 200.

According to method 1000, an amount of powder material 202 is discharged from powder-deposition opening 126 to powder-bed volume 204, during rotation of powder-supply arm 108 about vertical axis A1. Powder-bed volume 204 is a contained volume of powder material 202 within which object 200 is formed layer-by-layer from powder material 202. In one or more examples, a single rotation of powder-supply arm 108 discharges a sufficient amount of powder material 202 to powder-bed volume 204 to form a fresh layer of powder material 202.

Subsequent to discharging powder material 202, powder material 202 is distributed throughout powder-bed volume 204 to form the layer of powder material 202 using powder-distribution blade 128, during rotation of powder-supply arm 108 about vertical axis A1. In one or more examples, a single rotation of powder-supply arm 108 completely distributes powder material 202 to form an even layer of powder material 202.

Subsequent to distributing powder material 202, a portion of powder material 202 is consolidated using energy emitters 114 to form at least a portion of a layer of object 200, during rotation of energy-supply arm 112. In one or more examples, a single rotation of powder-supply arm 108 fully consolidates a portion of powder material 202 to form the portion of the layer of object 200.

Subsequent rotations of powder-supply arm 108 and energy-supply arm 112 repeat the above process to discharge subsequent amounts of powder material 202, to distribute to the subsequent amounts of powder material 202 to form subsequent layers of powder material 202, and to consolidate a portion of powder material 202 of each one of the subsequent layers of powder material 202 to form subsequent layers of object 200.

Referring generally to FIG. 35 and particularly to, e.g., FIGS. 1A, 1B, and 2-4 for illustrative purposes only and not by way of limitation, method 1000 further comprises, (block 1006) rotating powder-supply arm 108 and energy-supply arm 112 about vertical axis A1 at constant speed. The preceding portion of this paragraph characterizes example 40 of the subject matter, disclosed herein, where example 40 also encompasses example 39, above.

Continuously rotating powder-supply arm 108 and energy-supply arm 112 at a constant speed (e.g., at a constant angular velocity) improves processing time and efficiency of method 1000 by eliminating acceleration and deceleration associated with changes in speed. Rotating energy-supply arm 112 at constant speed simplifies command and control of actuation controls for energy emitters 114.

In one or more examples, when rotating energy-supply arm 112 about vertical axis A1, each one of energy emitters 114 is selectively actuated when each one of energy emitters 114 is located at a preselected Polar coordinate, associated with a corresponding location on powder-bed volume 204 to consolidate a portion of powder material 202. Thus, when rotating energy-supply arm 112 at a constant speed, the location of each one of energy emitters 114 can be easily calculated and accurately predicted at any time during formation of object 200. In one or more examples, one or more of energy emitters 114 is selectively actuated at a predetermined time or for a predetermined period based on the location of energy-supply arm 112 during rotation of energy-supply arm 112 to consolidate a portion of powder material 202.

In one or more examples, actuation of each one of energy emitters 114 during consolidation of powder material 202 is performed under computer control, such as by controller 238.

Referring generally to FIG. 35 and particularly to, e.g., FIGS. 1A, 1B, 2, and 3 for illustrative purposes only and not by way of limitation, according to method 1000, powder-supply arm 108 and energy-supply arm 112 are coupled to shaft 104 that is coupled to support 102. According to method 1000, (block 1006) rotating powder-supply arm 108 and energy-supply arm 112 about vertical axis A1 comprises (block 1008) rotating shaft 104 about vertical axis A1. The preceding portion of this paragraph characterizes example 41 of the subject matter, disclosed herein, where example 41 also encompasses example 40, above.

Shaft 104 structurally supports powder-supply arm 108 and energy-supply arm 112 during rotation about vertical axis A1. Rotating shaft 104 about vertical axis A1 relative to support 102, in turn, rotates powder-supply arm 108 and energy-supply arm 112 about vertical axis A1. In one or more examples, rotary drive 116 is configured to rotate shaft 104 about vertical axis A1 relative to support 102.

Referring generally to FIG. 35 and particularly to, e.g., FIGS. 1A, 1B, and 4 for illustrative purposes only and not by way of limitation, according to method 1000, powder-supply arm 108 and energy-supply arm 112 are coupled to shaft 104 that is coupled to support 102. Also according to method 1000, (block 1006) rotating powder-supply arm 108 and energy-supply arm 112 about vertical axis A1 comprises (block 1010) rotating powder-supply arm 108 and energy-supply arm 112 about vertical axis A1 relative to shaft 104. The preceding portion of this paragraph characterizes example 42 of the subject matter, disclosed herein, where example 42 also encompasses example 40, above.

Rotating powder-supply arm 108 and energy-supply arm 112 relative to shaft 104 rotates powder-supply arm 108 and energy-supply arm 112 about vertical axis A1. In one or more examples, rotary drive 116 is configured to rotate powder-supply arm 108 and energy-supply arm 112 about vertical axis A1 relative to shaft 104.

Referring generally to FIG. 35 and particularly to, e.g., FIGS. 1A, 1B, and 4 for illustrative purposes only and not by way of limitation, method 1000 further comprises (block 1002) transferring powder material 202 from powder-material source 106 to interior volume 124 of hollow body 122 of powder-supply arm 108. The preceding portion of this paragraph characterizes example 43 of the subject matter, disclosed herein, where example 43 also encompasses any one of examples 39 to 42, above.

Transferring powder material 202 from powder-material source 106 to interior volume 124 of hollow body 122 supplies powder material 202 to powder-supply arm 108 for discharge from powder-deposition opening 126, which is in communication with interior volume 124 of hollow body 122.

In one or more examples, powder material 202 is transferred directly from hopper 148 to interior volume 124 of hollow body 122 of powder-supply arm 108. In one or more examples, powder material 202 is transferred from hopper 148 to tubular chamber 150 and is then transferred from tubular chamber 150 to interior volume 124 of hollow body 122 of powder-supply arm 108.

Referring generally to FIG. 35 and particularly to, e.g., FIGS. 1A and 1B, 27, and 28 for illustrative purposes only and not by way of limitation, method 1000 further comprises (block 1004) conveying powder material 202 through interior volume 124 of hollow body 122 in a direction away from vertical axis A1 and perpendicular to vertical axis A1. The preceding portion of this paragraph characterizes example 44 of the subject matter, disclosed herein, where example 44 also encompasses example 43, above.

Conveying powder material 202 through interior volume 124 of hollow body 122 facilitates movement of powder material 202 from powder-supply-arm proximal end 134 to powder-supply-arm distal end 136 and ensures powder material 202 is discharged from an entirely of length L1 of powder-deposition opening 126.

In one or more examples, powder material 202 is conveyed through interior volume 124 of hollow body 122 in a direction away from vertical axis A1 and perpendicular to vertical axis A1 using conveyor screw 140 that is located within interior volume 124 of hollow body 122 and that extends along powder-deposition opening 126.

Referring generally to FIG. 35 and particularly to, e.g., FIGS. 1A, 1B, and 26 for illustrative purposes only and not by way of limitation, method 1000 further comprises (block 1016) at least partially opening or closing powder-deposition opening 126. The preceding portion of this paragraph characterizes example 45 of the subject matter, disclosed herein, where example 45 also encompasses example 43 or 44, above.

Selectively opening or closing powder-deposition opening 126 enables powder material 202 to be selectively discharged from powder-deposition opening 126 while rotating powder-supply arm 108 and energy-supply arm 112 about vertical axis A1.

In one or more examples, powder-deposition opening 126 is at least partially opened or closed using door 144. In one or more examples, partially opening powder-deposition opening 126 enables selective control of width W of powder-deposition opening 126. Selective control of width W of powder-deposition opening 126 enables selective control of a rate of discharge of powder material 202 from powder-deposition opening 126 while rotating powder-supply arm 108 about vertical axis A1.

Referring generally to FIG. 35 and particularly to, e.g., FIGS. 1A, 1B, 12-14, and 31 for illustrative purposes only and not by way of limitation, according to method 1000, (block 1012) discharging powder material 202 from powder-deposition opening 126 in hollow body 122 of powder-supply arm 108, while rotating powder-supply arm 108 and energy-supply arm 112 about vertical axis A1, comprises (block 1014) discharging a greater amount of powder material 202 from powder-deposition opening 126 at a first location along powder-deposition opening 126 than at a second location along powder-deposition opening 126 that is closer to vertical axis A1 than the first location. The preceding portion of this paragraph characterizes example 46 of the subject matter, disclosed herein, where example 46 also encompasses any one of examples 43 to 45, above.

Discharging a greater amount of powder material 202 from powder-deposition opening 126 at the first location along powder-deposition opening 126 than at the second location along powder-deposition opening 126 facilitates deposition of a greater amount of powder material 202 at a first location in powder-bed volume 204 and deposition of a lesser amount of powder material 202 at a second location in powder-bed volume 204 that is closer to vertical axis A1 than the first location.

In one or more examples, the amount of powder material 202 discharged from powder-deposition opening 126 and deposited to powder-bed volume 204 increases proportionally to a distance from vertical axis A1. In one or more examples, increasing the amount of powder material 202 discharged from powder-deposition opening 126 is achieved by increasing width W of powder-deposition opening 126 in a direction along powder-supply-arm central axis A2 and away from vertical axis A1. In one or more examples, when door 144 is positioned relative to hollow body 122 of powder-supply arm 108 so that powder-deposition opening 126 is partially open, width W of at least portion of powder-deposition opening 126 increases along powder-supply-arm central axis A2 of powder-supply arm 108 in a direction away from vertical axis A1.

Referring generally to FIG. 35 and particularly to, e.g., FIGS. 1A, 1B, 6, 7, and 11-13 for illustrative purposes only and not by way of limitation, according to method 1000, (block 1022) distributing powder material 202 within powder-bed volume 204 using powder-distribution blade 128 that is coupled to hollow body 122 and extends along powder-deposition opening 126, while rotating powder-supply arm 108 and energy-supply arm 112 about vertical axis A1, comprises (block 1024) moving a portion of powder material 202 in a direction away from vertical axis A1. The preceding portion of this paragraph characterizes example 47 of the subject matter, disclosed herein, where example 47 also encompasses any one of examples 43 to 46, above.

Using powder-distribution blade 128 to move a portion of powder material 202 in a direction away from vertical axis A1, while rotating powder-supply arm 108 about vertical axis A1, facilitates movement of powder material 202 radially outward relative to vertical axis A1 to form an even layer of powder material 202 within powder-bed volume 204.

In one or more examples, blade central axis A4 is oblique to powder-supply-arm central axis A2, when viewed along vertical axis A1, which facilitates movement of powder material 202 in a direction away from (e.g., radially outward relative to) vertical axis A1 using powder-distribution blade 128, while rotating powder-supply arm 108 about vertical axis A1.

In one or more examples, powder-supply arm 108 and powder-distribution blade 128 are curved in a viewing plane that is perpendicular to vertical axis A1, which facilitates movement of powder material 202 in a direction away from (e.g., radially outward relative to) vertical axis A1 using powder-distribution blade 128, while rotating powder-supply arm 108 about vertical axis A1.

Referring generally to FIG. 35 and particularly to, e.g., FIGS. 1A, 1B, and 26-28 for illustrative purposes only and not by way of limitation, method 1000 further comprises (block 1028) collecting an excess amount of powder material 202, moved beyond a perimeter boundary of powder-bed volume 204 by powder-distribution blade 128, in trough 208. The preceding portion of this paragraph characterizes example 48 of the subject matter, disclosed herein, where example 48 also encompasses example 47, above.

Collecting an excess amount of powder material 202 facilitates recycling of powder material in the additive manufacturing operation.

In one or more examples, trough 208 surrounds build platform 206 and collects an excess amount of powder material 202 that is moved beyond a perimeter boundary of build platform 206 and powder-bed volume 204 by powder-distribution blade 128 during rotation of powder-supply arm 108.

Referring generally to FIG. 35 and particularly to, e.g., FIGS. 1A, 1B, and 26-28 for illustrative purposes only and not by way of limitation, method 1000 further comprises (block 1030) transferring the excess amount of powder material 202 from trough 208 to powder-material source 106. The preceding portion of this paragraph characterizes example 49 of the subject matter, disclosed herein, where example 49 also encompasses example 48, above.

Transferring an excess amount of powder material 202 back to powder-material source 106 facilitates reuse of powder material in the additive manufacturing operation.

In one or more examples, transferring the excess amount of powder material 202 from trough 208 back to powder-material source 106 is performed using powder-recycling device 210 that is in communication with trough 208 and powder-material source 106.

Referring generally to FIG. 35 and particularly to, e.g., FIGS. 1A, 1B, and 16 for illustrative purposes only and not by way of limitation, method 1000 further comprises, (block 1026) while rotating powder-supply arm 108 and energy-supply arm 112 about vertical axis A1, preventing at least some of powder material 202 from moving in a direction toward vertical axis A1. The preceding portion of this paragraph characterizes example 50 of the subject matter, disclosed herein, where example 50 also encompasses any one of examples 43 to 49, above.

Preventing at least some of powder material 202 from moving in a direction toward vertical axis A1 prevents powder material 202 from building up at a center of build platform 206 or at center of powder-bed volume 204.

In one or more examples, preventing at least some of powder material 202 from moving in a direction toward vertical axis A1 is performed using powder barrier 146 that is coupled to powder-distribution blade 128 proximate to powder-supply-arm proximal end 134 and extending between powder-deposition opening 126 and vertical axis A1.

Referring to FIG. 35 and particularly to, e.g., FIGS. 1A, 1B, 29, and 30 for illustrative purposes only and not by way of limitation, according to method 1000, energy emitters 114 are in one of electrical or optical communication with energy source 110. Also according to method 1000, (block 1032) consolidating at least a portion of powder material 202 in powder-bed volume 204 using energy emitters 114, coupled to energy-supply arm 112, while rotating powder-supply arm 108 and energy-supply arm 112 about vertical axis A1, comprises (block 1034) heating at least a portion of powder material 202. The preceding portion of this paragraph characterizes example 51 of the subject matter, disclosed herein, where example 51 also encompasses any one of examples 39 to 50, above.

Heating at least a portion of powder material 202 enables at least a portion of powder material 202 to be one of melted or sintered to form at least a portion of object 200.

In one or more examples, electrical energy is provided to energy emitters 114 by energy source 110. In one or more examples, energy source 110 is an electrical generator.

In one or more examples, each one of energy emitters 114 includes, or takes the form of, laser emitting diode 160. In one or more examples, laser emitting diode 160 is configured to generate and emit optical energy in the form of a laser beam to heat at least a portion of powder material 202 and to form at least a portion of object 200.

In one or more examples, each one of energy emitters 114 includes, or takes the form of, an electron beam emitter. In one or more examples, the electron beam emitter is configured to generate and emit energy in the form of an electron beam to heat at least a portion of powder material 202 and to form at least a portion of object 200.

In one or more examples, optical energy is provided to energy emitters 114 by energy source 110. In one or more examples, energy source 110 is a laser.

In one or more examples, each one of energy emitters 114 is optical output 162 (e.g., an outlet of a fiber-optic cable) that is in optical communication with second energy-transmission line 168. In one or more examples, optical output 162 is configured to emit optical energy in the form of a laser beam to heat at least a portion of powder material 202 and to form at least a portion of object 200.

Referring to FIG. 35 and particularly to, e.g., FIGS. 1A, 1B, 29, and 30 for illustrative purposes only and not by way of limitation, according to method 1000, (block 1032) consolidating at least a portion of powder material 202 in powder-bed volume 204 using energy emitters 114, coupled to energy-supply arm 112, while rotating powder-supply arm 108 and energy-supply arm 112 about vertical axis A1, comprises (block 1036) at least partially overlapping energy beams 228, emitted from energy emitters 114. The preceding portion of this paragraph characterizes example 52 of the subject matter, disclosed herein, where example 52 also encompasses any one of examples 39 to 51, above.

At least partial overlapping of energy beams 228, emitted from energy emitters 114, provides for an at least partially overlapping scan field so that a substantially continuous portion of powder material 202 can be consolidated into a substantially continuous portion of object 200 during a single rotation of energy-supply arm 112, which, in turn, increases efficiency of method 1000.

In one or more examples, focal spots 226 of at least two of energy beams 228, corresponding to at least two of energy emitters 114, encounter or at least partially overlap approximately the same location on powder-bed volume 204 during rotation of energy-supply arm 112 about vertical axis A1.

In one or more examples, focal spots 226 of at least two of energy beams 228, corresponding to at least two of energy emitters 114 of linear array 172 (FIG. 18), encounter or at least partially overlap approximately the same location on powder-bed volume 204 during rotation of energy-supply arm 112 about vertical axis A1.

In one or more examples, focal spots 226 of at least two of energy beams 228, corresponding to at least one of energy emitters 114 of linear array 172 and at least one of energy emitters 114 of second linear array 178 (FIGS. 19 and 20), encounter or at least partially overlap approximately the same location on powder-bed volume 204 during rotation of energy-supply arm 112 about vertical axis A1.

In one or more examples, focal spots 226 of at least one of energy beams 228, corresponding to at least one of energy emitters 114 of linear array 172 and at least one of energy emitters 114 of second linear array 178 and/or third linear series 232 (FIG. 21), encounter or at least partially overlap approximately the same location on powder-bed volume 204 during rotation of energy-supply arm 112 about vertical axis A1.

In one or more examples, focal spots 226 of energy beams 228, corresponding to energy emitters 114 of each one of sets 184 (FIG. 22), encounter or at least partially overlap approximately the same location on powder-bed volume 204 during rotation of energy-supply arm 112 about vertical axis A1.

Referring to FIG. 35 and particularly to, e.g., FIGS. 1A, 1B, 22, and 23 for illustrative purposes only and not by way of limitation, according to method 1000, energy emitters 114 comprise pre-heat emitter 186 and melt emitter 188, arranged along circular path 230, circumscribing vertical axis A1 and centered on vertical axis A1. Also according to method 1000, (block 1032) consolidating at least a portion of powder material 202 in powder-bed volume 204 using energy emitters 114, coupled to energy-supply arm 112, while rotating powder-supply arm 108 and energy-supply arm 112 about vertical axis A1, comprises (block 1038) pre-heating at least a portion of powder material 202 to a first temperature using pre-heat emitter 186 and (block 1040) heating at least a portion of powder material 202 to a second temperature, which is greater than the first temperature, using melt emitter 188 after pre-heating at least a portion of powder material 202 using pre-heat emitter 186. The preceding portion of this paragraph characterizes example 53 of the subject matter, disclosed herein, where example 53 also encompasses any one of examples 39 to 52, above.

Pre-heat emitter 186 and melt emitter 188 of each one of sets 184 being arranged along a corresponding one of circular paths 230 enables pre-heating a portion of powder material 202 and subsequent melting the portion of powder material 202 at a corresponding location on powder-bed volume 204 during one rotation of energy-supply arm 112 about vertical axis A1, which increases efficiency and quality of the consolidation operation and improves material properties of object 200.

In one or more examples, pre-heating and subsequently melting powder material 202 gradually increases the temperature of the portion of powder material 202 being consolidated to the consolidation temperature as compared to a consolidation operation where powder material is rapidly heated to the consolidation temperature.

Referring generally to FIG. 35 and particularly to, e.g., FIGS. 1A, 1B, 22, and 23 for illustrative purposes only and not by way of limitation, according to method 1000, energy emitters 114 further comprise post-heat emitter 192, arranged along circular path 230 between pre-heat emitter 186 and post-heat emitter 192. Also according to method 1000, (block 1032) consolidating at least a portion of powder material 202 in powder-bed volume 204 using energy emitters 114, coupled to energy-supply arm 112, while rotating powder-supply arm 108 and energy-supply arm 112 about vertical axis A1, further comprises (block 1042) post-heating at least a portion of powder material 202 to a third temperature, which is less than the second temperature, using post-heat emitter 192 after heating at least a portion of powder material 202 using melt emitter 188. The preceding portion of this paragraph characterizes example 54 of the subject matter, disclosed herein, where example 54 also encompasses example 53, above.

Post-heat emitter 192 of each one of sets 184 being arranged along a corresponding one of circular paths 230 enables controlled cooling of the portion of powder material 202 after melting the portion of powder material at a corresponding location on powder-bed volume 204 during rotation of energy-supply arm 112 about vertical axis A1, which increases quality of the consolidation operation.

In one or more examples, post-heating powder material 202 gradually decreases the temperature of the portion of powder material 202 being consolidated as compared to a consolidation operation where powder material is rapidly cooled.

Referring generally to FIG. 35 and particularly to, e.g., FIGS. 1A, 1B, and 26-28 for illustrative purposes only and not by way of limitation, method 1000 further comprises (block 1018) supporting powder-bed volume 204 on build platform 206. Method 1000 also comprises, (block 1020) while rotating powder-supply arm 108 and energy-supply arm 112 about vertical axis A1, moving build platform 206 away from powder-supply arm 108 and energy-supply arm 112 along vertical axis A1. The preceding portion of this paragraph characterizes example 55 of the subject matter, disclosed herein, where example 55 also encompasses any one of examples 39 to 54, above.

Moving build platform 206 along vertical axis A1 relative to powder-supply arm 108 and energy-supply arm 112 facilitates successive layering of powder material 202 in powder-bed volume 204. Moving build platform 206 along vertical axis A1 also maintains trough 208 in an appropriate position for collecting an excess amount of powder material 202 that is moved beyond a perimeter boundary of powder-bed volume 204 during rotation of powder-supply arm 108 about vertical axis A1.

In one or more examples, build platform 206 continuously moves away from powder-supply arm 108 and energy-supply arm 112 during continuous rotation of powder-supply arm 108 and energy-supply arm 112 about vertical axis A1. The speed of movement of build platform 206 corresponds to the rotational speed of powder-supply arm 108 and energy-supply arm 112 so that build platform 206 is appropriately located for deposition and distribution of each subsequent layer of powder material 202.

Figure 37:
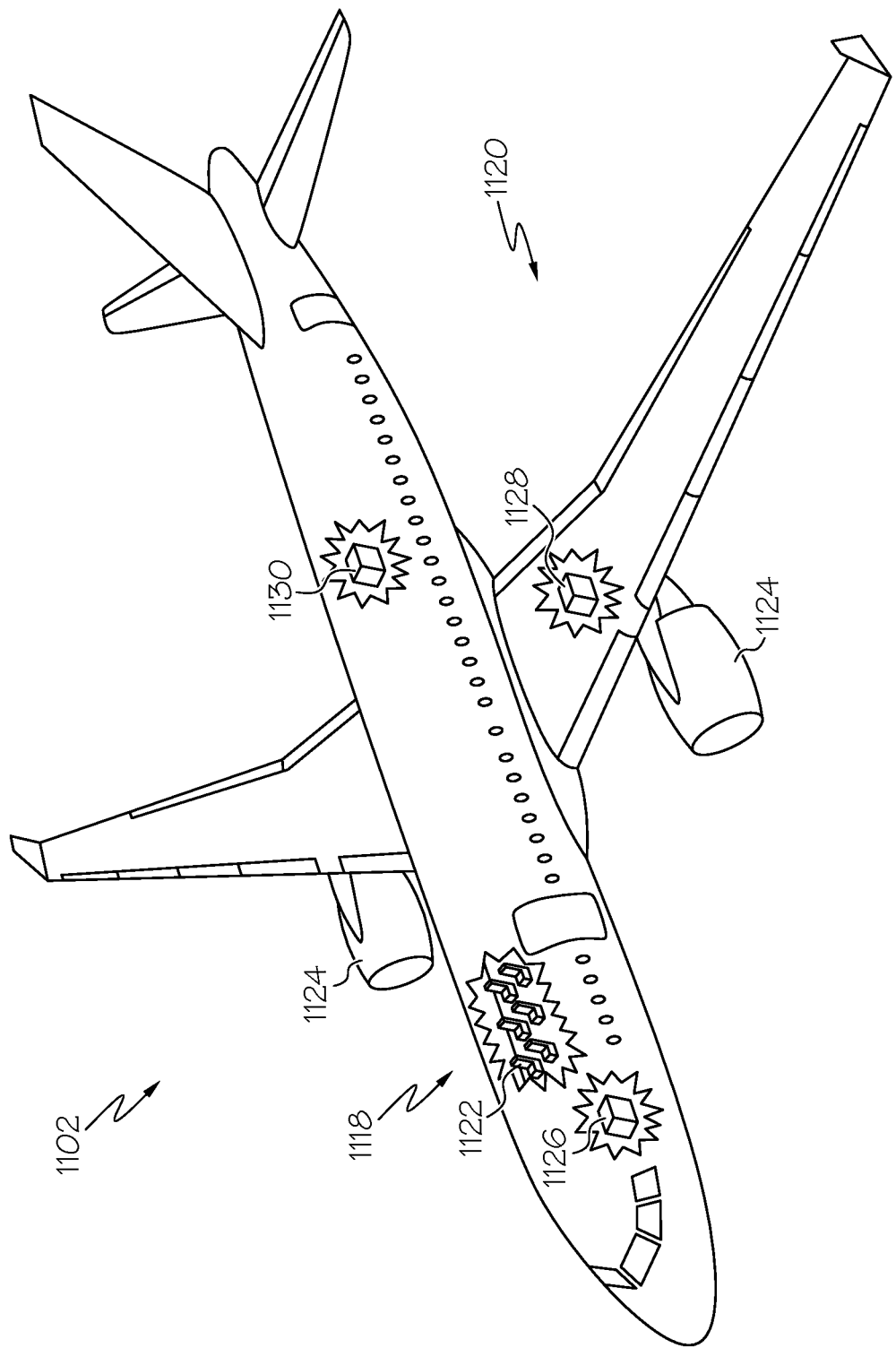
FIG. 37 is a schematic illustration of an aircraft.

Examples of the subject matter disclosed herein may be described in the context of aircraft manufacturing and service method 1100 as shown in FIG. 36 and aircraft 1102 as shown in FIG. 37. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 37, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples, set forth herein, will come to mind to one skilled in the art, to which the present disclosure pertains, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method (1000) for additively manufacturing an object (200) from a powder material (202), the method (1000) comprising steps of:
   moving a door (144), coupled to a hollow body (122) of a powder-supply arm (108), relative to the hollow body (122) of the powder-supply arm (108) to at least partially open a powder-deposition opening (126) in the hollow body (122) of the powder-supply arm (108);
   discharging the powder material (202) from the powder-deposition opening (126) in the hollow body (122) of the powder-supply arm (108), while rotating the powder-supply arm (108) and an energy-supply arm (112) about a vertical axis (A1);
   while rotating the powder-supply arm (108) and the energy-supply arm (112) about the vertical axis (A1), distributing the powder material (202) within a powder-bed volume (204) using a powder-distribution blade (128) that is coupled to the hollow body (122) and extends along the powder-deposition opening (126); and
   while rotating the powder-supply arm (108) and the energy-supply arm (112) about the vertical axis (A1), consolidating at least a portion of the powder material (202) in the powder-bed volume (204) using energy emitters (114), coupled to the energy-supply arm (112),
   wherein, with the door (144) positioned relative to the hollow body (122) of the powder-supply arm (108) so that the powder-deposition opening (126) is partially open, at least a portion of the powder-deposition opening (126) increases in width along a powder-supply-arm central axis (A2) of the powder-supply arm (108) in a direction away from the vertical axis (A1).

2. The method (1000) according to claim 1, further comprising a step of rotating the powder-supply arm (108) and the energy-supply arm (112) about the vertical axis (A1) at a constant speed.

3. The method (1000) according to claim 2, wherein:
   the powder-supply arm (108) and the energy-supply arm (112) are coupled to a shaft (104) that is coupled to a support (102); and
   the step of rotating the powder-supply arm (108) and the energy-supply arm (112) about the vertical axis (A1) comprises rotating the shaft (104) about the vertical axis (A1).

4. The method (1000) according to claim 2, wherein:
   the powder-supply arm (108) and the energy-supply arm (112) are coupled to a shaft (104) that is coupled to a support (102); and
   the step of rotating the powder-supply arm (108) and the energy-supply arm (112) about the vertical axis (A1) comprises rotating the powder-supply arm (108) and the energy-supply arm (112) about the vertical axis (A1) relative to the shaft (104).

5. The method (1000) according to claim 1, further comprising transferring the powder material (202) from a powder-material source (106) to an interior volume (124) of the hollow body (122) of the powder-supply arm (108).

6. The method (1000) according to claim 5, further comprising conveying the powder material (202) through the interior volume (124) of the hollow body (122) in a direction away from the vertical axis (A1) and perpendicular to the vertical axis (A1).

7. The method (1000) according to claim 5, wherein the step of discharging the powder material (202) from the powder-deposition opening (126) in the hollow body (122) of the powder-supply arm (108), while rotating the powder-supply arm (108) and the energy-supply arm (112) about the vertical axis (A1), comprises discharging a greater amount of the powder material (202) from the powder-deposition opening (126) at a first location along the powder-deposition opening (126) than at a second location along the powder-deposition opening (126) that is closer to the vertical axis (A1) than the first location.

8. The method (1000) according to claim 5, wherein the step of distributing the powder material (202) within the powder-bed volume (204) using the powder-distribution blade (128) that is coupled to the hollow body (122) and extends along the powder-deposition opening (126), while rotating the powder-supply arm (108) and the energy-supply arm (112) about the vertical axis (A1), comprises moving a portion of the powder material (202) in a direction away from the vertical axis (A1).

9. The method (1000) according to claim 8, further comprising collecting an excess amount of the powder material (202), moved beyond a perimeter boundary of the powder-bed volume (204) by the powder-distribution blade (128), in a trough (208).

10. The method (1000) according to claim 9, further comprising transferring the excess amount of the powder material (202) from the trough (208) to the powder-material source (106).

11. The method (1000) according to claim 5, further comprising, while rotating the powder-supply arm (108) and the energy-supply arm (112) about the vertical axis (A1), preventing at least some of the powder material (202) from moving in a direction toward the vertical axis (A1).

12. The method (1000) according to claim 1, wherein:
   the energy emitters (114) are in one of electrical or optical communication with an energy source (110); and
   the step of consolidating at least the portion of the powder material (202) in the powder-bed volume (204) using the energy emitters (114), coupled to the energy-supply arm (112), while rotating the powder-supply arm (108) and the energy-supply arm (112) about the vertical axis (A1), comprises heating at least the portion of the powder material (202).

13. The method (1000) according to claim 1, wherein the step of consolidating at least the portion of the powder material (202) in the powder-bed volume (204) using the energy emitters (114), coupled to the energy-supply arm (112), while rotating the powder-supply arm (108) and the energy-supply arm (112) about the vertical axis (A1), comprises at least partially overlapping energy beams (228), emitted from the energy emitters (114).

14. The method (1000) according to claim 1, wherein:

the energy emitters (114) comprise a pre-heat emitter (186) and a melt emitter (188), each arranged along a circular path (230), circumscribing the vertical axis (A1) and centered on the vertical axis (A1); and the step of consolidating at least the portion of the powder material (202) in the powder-bed volume (204) using the energy emitters (114), coupled to the energy-supply arm (112), while rotating the powder-supply arm (108) and the energy-supply arm (112) about the vertical axis (A1), comprises:

pre-heating at least the portion of the powder material (202) to a first temperature using the pre-heat emitter (186); and heating at least the portion of the powder material (202) to a second temperature, which is greater than the first temperature, using the melt emitter (188) after pre-heating at least the portion of the powder material (202) using the pre-heat emitter (186).

15. The method (1000) according to claim 14, wherein:

the energy emitters (114) further comprise a post-heat emitter (192), arranged along the circular path (230); and the step of consolidating at least the portion of the powder material (202) in the powder-bed volume (204) using the energy emitters (114), coupled to the energy-supply arm (112), while rotating the powder-supply arm (108) and the energy-supply arm (112) about the vertical axis (A1), further comprises post-heating at least the portion of the powder material (202) to a third temperature, which is less than the second temperature, using the post-heat emitter (192) after heating at least the portion of the powder material (202) using the melt emitter (188).

16. The method (1000) according to claim 1, further comprising:

supporting the powder-bed volume (204) on a build platform (206); and while rotating the powder-supply arm (108) and the energy-supply arm (112) about the vertical axis (A1), moving the build platform (206) away from the powder-supply arm (108) and the energy-supply arm (112) along the vertical axis (A1).

* * * * *